US008321628B2

(12) United States Patent (10) Patent No.: US 8,321,628 B2
Sakai et al. (45) Date of Patent: Nov. 27, 2012

(54) STORAGE SYSTEM, STORAGE CONTROL DEVICE, AND METHOD

(75) Inventors: Motohiro Sakai, Kawasaki (JP); Kazuma Takatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 377 days.

(21) Appl. No.: 12/790,035

(22) Filed: May 28, 2010

(65) Prior Publication Data

US 2010/0312958 A1 Dec. 9, 2010

(30) Foreign Application Priority Data

Jun. 3, 2009 (JP) .................................. 2009-133798

(51) Int. Cl.
*G06F 12/00* (2006.01)
(52) U.S. Cl. .......................................... 711/112; 711/4
(58) Field of Classification Search ........................ None
See application file for complete search history.

(56) References Cited

U.S. PATENT DOCUMENTS

| 6,557,073 | B1 * | 4/2003 | Fujiwara et al. ............. 711/111 |
| 7,571,291 | B2 | 8/2009 | Sasage et al. |
| 2007/0260835 | A1 | 11/2007 | Takatsu |
| 2007/0266203 | A1 | 11/2007 | Amano et al. |
| 2007/0266204 | A1 | 11/2007 | Mizuno |

FOREIGN PATENT DOCUMENTS

| JP | 9-6678 | 1/1997 |
| JP | 9-81464 | 3/1997 |
| JP | 2000-20247 | 1/2000 |
| JP | 2003-316525 | 11/2003 |
| JP | 2006-79273 | 3/2006 |
| JP | 2006-190039 | 7/2006 |
| JP | 2007-305075 | 11/2007 |
| JP | 2007-305076 | 11/2007 |
| WO | WO 2006/085357 | 8/2006 |

OTHER PUBLICATIONS

Japanese Patent Office Notification of Reason for Refusal mailed Sep. 13, 2011 for corresponding Japanese Patent Application No. 2009-133798.
Japanese Patent Office Action mailed Apr. 19, 2001 for corresponding Japanese Patent Application No. 2009-133798.

* cited by examiner

*Primary Examiner* — Brian Peugh
(74) *Attorney, Agent, or Firm* — Staas & Halsey LLP

(57) ABSTRACT

A storage system includes an interface processor for receiving a read or write request, a primary storage, a secondary storage, a storage control device and a temporary storage area for temporarily storing data for the primary storage in case that an access to the primary storage fails. The storage control device includes a controller for, in case that the access to the primary storage fails when the read request is received by the interface processor, determining whether the read requested data is stored on the temporary storage area, controlling to read the read requested data from the temporary storage area when the read requested data is stored on the temporary storage area, and controlling to read the read requested data from the secondary storage when the requested data is not stored on the temporary storage area.

20 Claims, 14 Drawing Sheets

| PHYSICAL VOLUME | LOGICAL VOLUME | ADDRESS | DATA STATUS |
|---|---|---|---|
| TAPE 0 | TAPE A0 | XXXXX | DIRTY |
| | | yyyyy | HIT |
| | | ⋮ | ⋮ |
| | TAPE A1 | zzzzz | MISS |
| | | ⋮ | ⋮ |
| ⋮ | ⋮ | ⋮ | ⋮ |

US 8,321,628 B2

STORAGE SYSTEM, STORAGE CONTROL DEVICE, AND METHOD

CROSS-REFERENCE TO RELATED APPLICATION

This application is based upon and claims the benefit of priority of the prior Japanese Patent Application No. 2009-133798, filed on Jun. 3, 2009, the entire contents of which are incorporated herein by reference.

FIELD

The embodiments discussed herein are related to a storage system, a storage control device and a storage control method.

BACKGROUND

A tape library device having magnetic tapes as a plurality of recording media is widely used to back up a large amount of data. The advantage of the magnetic tape is its low cost and large volume capacity while the disadvantage of the magnetic tape is that a data access speed thereof is slower than a data access speed of a hard disk drive (HDD). A hierarchical storage system has been recently used. In the hierarchical storage system, a disk array device including a plurality of HDDs is used as a cache mechanism (primary storage), and an even larger capacity tape library device is used as a back-end (secondary) storage.

The hierarchical storage system performs a process described below. If a data write request is received from a host device, the corresponding data is written first onto the primary storage. When the data write process is complete, a write process completion is reported back to the host device. The primary storage then writes the written data onto the secondary storage. If a data read request is received from the host device, the corresponding data, if stored on the primary storage, is transferred to the host device. If no corresponding data is stored on the primary storage, the data is read from the secondary storage and then written onto the primary storage. When the data write process is completed, the data is transferred from the primary storage to the host device.

However, once the primary storage fails in such a system, no access at all is permitted, regardless of whether the access is for the write process or the read process. For example, a read request may now be received from the host device. Even if the effective data is present on the secondary storage, the host device has difficulty in retrieving the data with the primary storage malfunctioning.

In a related art technique, a hierarchical storage system may include a fault-tolerance primary storage having a currently operative storage section and a backup storage section. A logical volume of a faulty current storage section is restored onto the backup storage section. However, this technique needs the backup storage section, leading to an increase in the manufacturing cost of the primary storage.

Another related art technique is related to a computer system. In the event of a memory failure, a copy of a faulty page is output from a trace cache to a secondary storage to restore the faulty page on the computer system. In yet another related art technique, if no hot spare is available on a primary storage having a mirroring structure during the occurrence of a disk degradation, another disk pair is disengaged to use one of the pair members as a hot spare.

When the primary storage malfunctions in the hierarchical storage system, accessing from the host device for writing and reading becomes difficult, and the operation of the system is suspended.

The followings are reference documents.
[Patent Document 1] Japanese Laid-open Patent Publication No. 2006-190039
[Patent Document 2] Japanese Laid-open Patent Publication No. 9-81464
[Patent Document 3] International Publication Pamphlet No. WO 2006/085357

SUMMARY

According to an aspect of the embodiment, a storage system for storing data includes an interface processor for receiving a read or write request, a primary storage, a secondary storage, a storage control device for controlling the primary storage to temporarily store a write requested data when the write request is received by the interface processor and to temporarily store a read requested data read from the secondary storage in case that the requested data is not stored on the primary storage when the read request is received, and controlling the secondary storage to store the write requested data stored on the primary storage, and a temporary storage area for temporarily storing data for the primary storage in case that an access to the primary storage fails, wherein the storage device including a controller for, in case that the access to the primary storage fails when the read request is received by the interface processor, determining whether the read requested data is stored on the temporary storage area, controlling to read the read requested data from the temporary storage area when the read requested data is stored on the temporary storage area, and controlling to read the read requested data from the secondary storage when the requested data is not stored on the temporary storage area.

According to an another aspect of the embodiment, a storage control device for controlling a primary storage to temporarily store a write requested data when a write request is received and to temporarily store a read requested data read from a secondary storage in case that the read requested data is not stored on the primary storage when the read request is received, and controlling the secondary storage to store the write requested data stored on the primary storage, the storage control device includes a controller for, in case that the access to the primary storage fails when the read request is received, determining whether the read requested data is stored on a temporary storage area for temporarily storing data for the primary storage, controlling to read the read requested data from the temporary storage area when the read requested data is stored on the temporary storage area, and controlling to read the read requested data from the secondary storage when the read requested data is not stored on the temporary storage area.

According to an another aspect of the embodiment, a storage control method for controlling an operation in a storage system including a primary storage, a secondary storage, and a storage control device for controlling the primary storage to temporarily store a write requested data when a write request is received and to temporarily store a read requested data read from the secondary storage in case that the read requested data is not stored on the primary storage when a read request is received, and controlling the secondary storage to store the write requested data stored on the primary storage, the storage control method includes, in case that an access to the primary storage fails when the read request is received, determining whether the read requested data is stored on a temporary storage area for temporarily storing data for the primary storage, controlling to read the read requested data from the temporary storage area when the read requested data is stored on the temporary storage area, and controlling to read the read requested data from the secondary storage when the requested data is not stored on the temporary storage area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates an example of data stored on a VL management table;

DESCRIPTION OF EMBODIMENTS

Preferred embodiments of the present techniques will be explained with reference to accompanying drawings.

Figure 1:
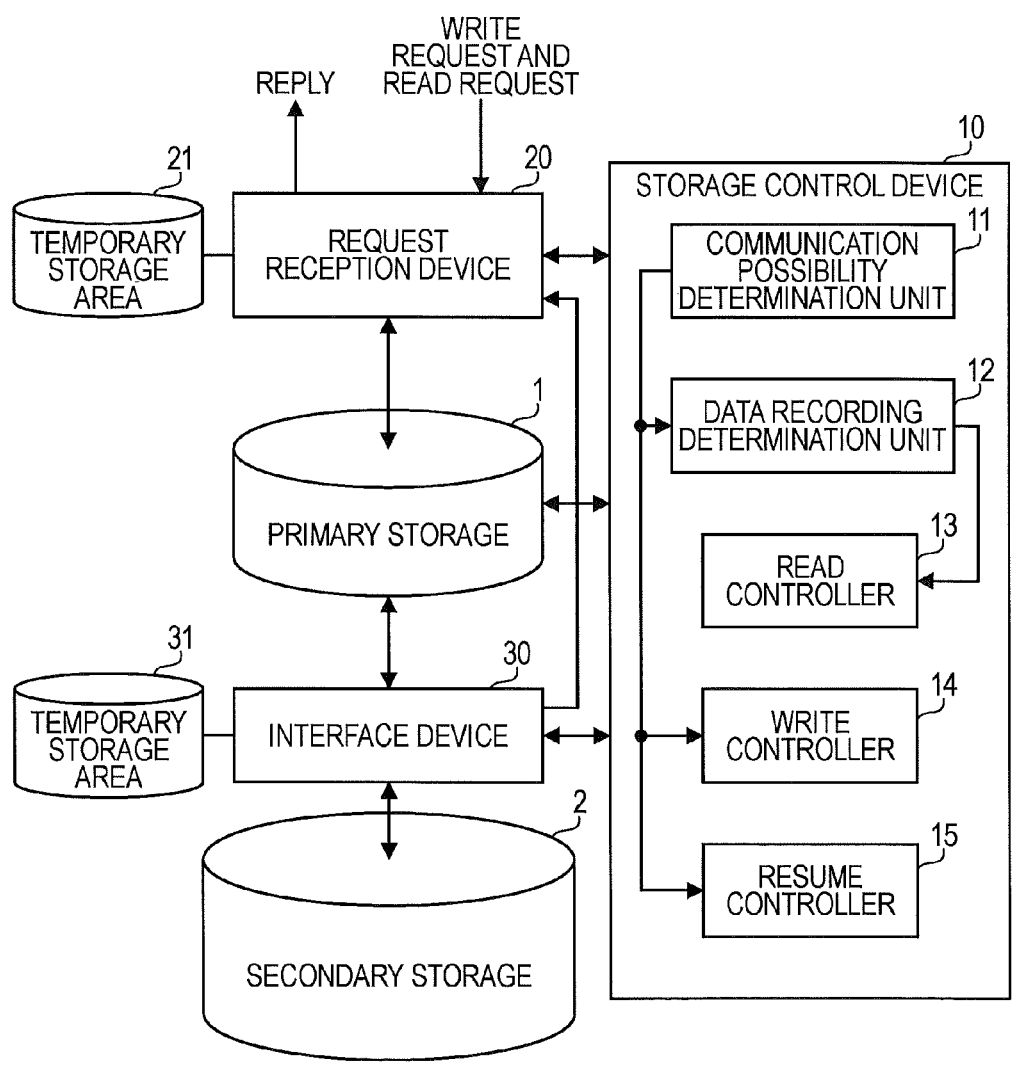
FIG. 1 illustrates a structure of a storage system in accordance with a first embodiment.

FIG. 1 illustrates a structure of a storage system of a first embodiment.

The storage system of FIG. 1 includes a primary storage 1, a secondary storage 2 larger in memory capacity than the primary storage 1 and lower in access speed than the primary storage 1, and a storage control device 10. A request reception device 20 and an interface device 30 are also connected to the storage system of the first embodiment.

The storage control device 10 controls the primary storage 1 and the secondary storage 2 such that the primary storage 1 and the secondary storage 2 operate as a hierarchical storage system. For example, if a write request to write data onto the secondary storage 2 is issued, the data is temporarily stored onto the primary storage 1 and then the data is also stored onto the secondary storage 2. If a read request to read data stored on the secondary storage 2 is issued, the storage control device 10 determines whether the data is cached on the primary storage 1. If the read requested data is cached on the primary storage 1, the cached data is output. On the other hand, if the read requested data is not cached on the primary storage 1, the read requested data is transferred from the secondary storage 2 to the primary storage 1 for storage, and then the data is output from the primary storage 1.

In accordance with the first embodiment, a request to write data to the secondary storage 2 and a request to read data from the secondary storage 2 are received by the request reception device 20. In this case, the storage control device 10 detects through the request reception device 20 that these requests have been received. The request reception device 20 receives these requests from an external device such as a host device. Alternatively, the request reception device 20 may receive these requests in response to a user operation of a user who operates an input device connected to own device.

The interface device 30 provides an interface function for accessing the secondary storage 2.

A function of the storage control device 10 is described below. The storage control device 10 includes communication possibility determination unit 11, data recording determination unit 12, read controller 13, write controller 14, and resume controller 15. The functions of these elements are performed when a central processing unit (CPU) included in the storage control device 10 executes a specific program.

When the request reception device 20 receives one of a read request and a write request, the communication possibility determination unit 11 determines whether the storage control device 10 may access to the primary storage 1. The communication possibility determination unit 11 determines that the communication between the storage control device 10 and the primary storage 1 is difficult if the primary storage 1 is in a faulty state or if a communication path between the primary storage 1 and the storage control device 10 fails.

When a read request is received by the request reception device 20, the data recording determination unit 12 determines whether the read requested data is stored on a specific storage area.

In response to the determination results of the data recording determination unit 12, the read controller 13 controls a read operation to read the read requested data from the storage area and an output operation to output the read requested data from the request reception device 20.

When a write request is received by the request reception device 20, the write controller 14 controls an operation to write the write requested data onto a specific storage area.

In response to the write request received by the request reception device 20, the resume controller 15 is activated when the communication possibility determination unit 11 determines that the communication between the storage control device 10 and the primary storage 1 is difficult. The resume controller 15 controls a data write operation when the communication between the storage control device 10 and the primary storage 1 resumes.

The operations of the above described functions are described in order. The operation in the state in which the storage control device 10 remains accessible to the primary storage 1 is described first.

When the request reception device 20 receives the read request, the communication possibility determination unit 11 determines whether the storage control device 10 remains accessible to the primary storage 1. If the storage control device 10 remains accessible the primary storage 1, the data recording determination unit 12 determines whether the read requested data is cached on the primary storage 1.

If the read requested data is cached on the primary storage 1, the read controller 13 controls a read operation to cause the data to be read from the primary storage 1 and an output operation to cause the request reception device 20 to output as a replay the read data responsive to the read request. If the read requested data is not cached on the primary storage 1, the read controller 13 causes the read requested data from the secondary storage 2 to be stored onto the primary storage 1. The read controller 13 then controls a read operation to cause the data to be read from the primary storage 1 and an output operation to cause the request reception device 20 to output as a replay the read data responsive to the read request.

If the write request is received by the request reception device 20, the communication possibility determination unit 11 determines whether the storage control device 10 remains accessible to the primary storage 1. If the storage control device 10 remains accessible to the primary storage 1, the write controller 14 causes the write requested data to be stored on the primary storage 1 and then causes the read data to be also stored onto the secondary storage 2.

A process performed in the state in which the communication between the storage control device 10 and the primary storage 1 is difficult is described below.

When the read request is received by the request reception device 20, the communication possibility determination unit 11 may determine that the communication between the storage control device 10 and the primary storage 1 is difficult. The data recording determination unit 12 then determines whether the read requested data is stored on the temporary storage area 21. The temporary storage area 21 is a storage area set up in a storage device solely connected to an information processing apparatus, excluding the primary storage 1 and the secondary storage 2, out of information processing apparatuses included in the storage system. Referring to FIG. 1, such an information processing apparatus may be one of the storage control device 10, the request reception device 20 and the interface device 30. The temporary storage area 21 may be set up in a non-volatile storage device such as an HDD and a RAM internally mounted in the information processing apparatus.

If the read requested data is stored on the temporary storage area 21, the read controller 13 reads the read requested data from the temporary storage area 21. The read controller 13 controls an output operation to cause the request reception device 20 to output the read requested data as a reply to the read request. If the requested data is not stored on the temporary storage area 21, the read controller 13 reads the read requested data from the secondary storage 2 and causes the read data to be stored onto the temporary storage area 21. The read controller 13 then causes the request reception device 20 to output the data stored on the temporary storage area 21 as a reply to the read request. Through this process, the temporary storage area 21 is used as a cache of the secondary storage 2 in the same way as the primary storage 1.

In response to the read request, an area set in the storage device solely connected to the request reception device 20 (the temporary storage area 21 illustrated in FIG. 1) is preferably used with high priority. If the requested data is stored on the temporary storage area 21, the data on the temporary storage area 21 is immediately output in reply.

When the write request is received by the request reception device 20, the communication possibility determination unit 11 may determine that the communication between the storage control device 10 and the primary storage 1 is difficult. The write controller 14 causes the write requested data to be stored onto the temporary storage area 21. After the write controller 14 has performed the write operation on the temporary storage area 21, the communication possibility determination unit 11 may determine that the communication between the storage control device 10 and the primary storage 1 has been restored. The resume controller 15 moves the write requested data from the temporary storage area 21 to the primary storage 1. The resume controller 15 further causes the data moved to the primary storage 1 to be also stored onto the secondary storage 2.

The write requested data is stored on the temporary storage area 21 through the above described process even if the data is not stored the primary storage 1. After the communication resumes, the data stored on the temporary storage area 21 is stored onto the primary storage 1 and the original operation thus resumes.

In response to the write request, an area set up in the storage device solely connected to the interface device 30 (excluding the secondary storage 2) is preferably used as a temporary storage area (a temporary storage area 31 illustrated in FIG. 1) with high priority. In the event that the data stored on the temporary storage area 31 needs to be output prior to the resumption of the access to the primary storage 1, the data stored on the temporary storage area 31 is moved onto the secondary storage 2 within a short period of time.

The storage system described above is continuously used by using the temporary storage area as backup system for the primary storage 1 even if the read request or the write request is received with the communication between the storage control device 10 and the primary storage 1 being in a difficult state. Since the temporary storage area is embodied using a hardware resource prepared within the storage system, the above described advantage is provided without any increase in the manufacturing cost of the system and the installation area of the system.

The storage control device 10 may directly receive one of the write request and the read request without using the request reception device 20. In such a case, the request reception device 20 becomes unnecessary. In response to the reception of the read request during the communication difficulty with the primary storage 1, the storage control device 10 may simply use, with high priority, a temporary storage area set up in a storage device solely connected to own device.

The storage control device 10 may be designed to access directly the secondary storage 2 not via the interface device 30. In such a case, the interface device 30 becomes unnecessary. In response to the write request during the communication difficulty with the primary storage 1, the storage control device 10 may simply use, with high priority, a temporary storage area set up in a storage device solely connected to own device.

A hierarchical storage system including a magnetic disk as a primary storage and a magnetic tape as a secondary storage is described below.

Figure 2:
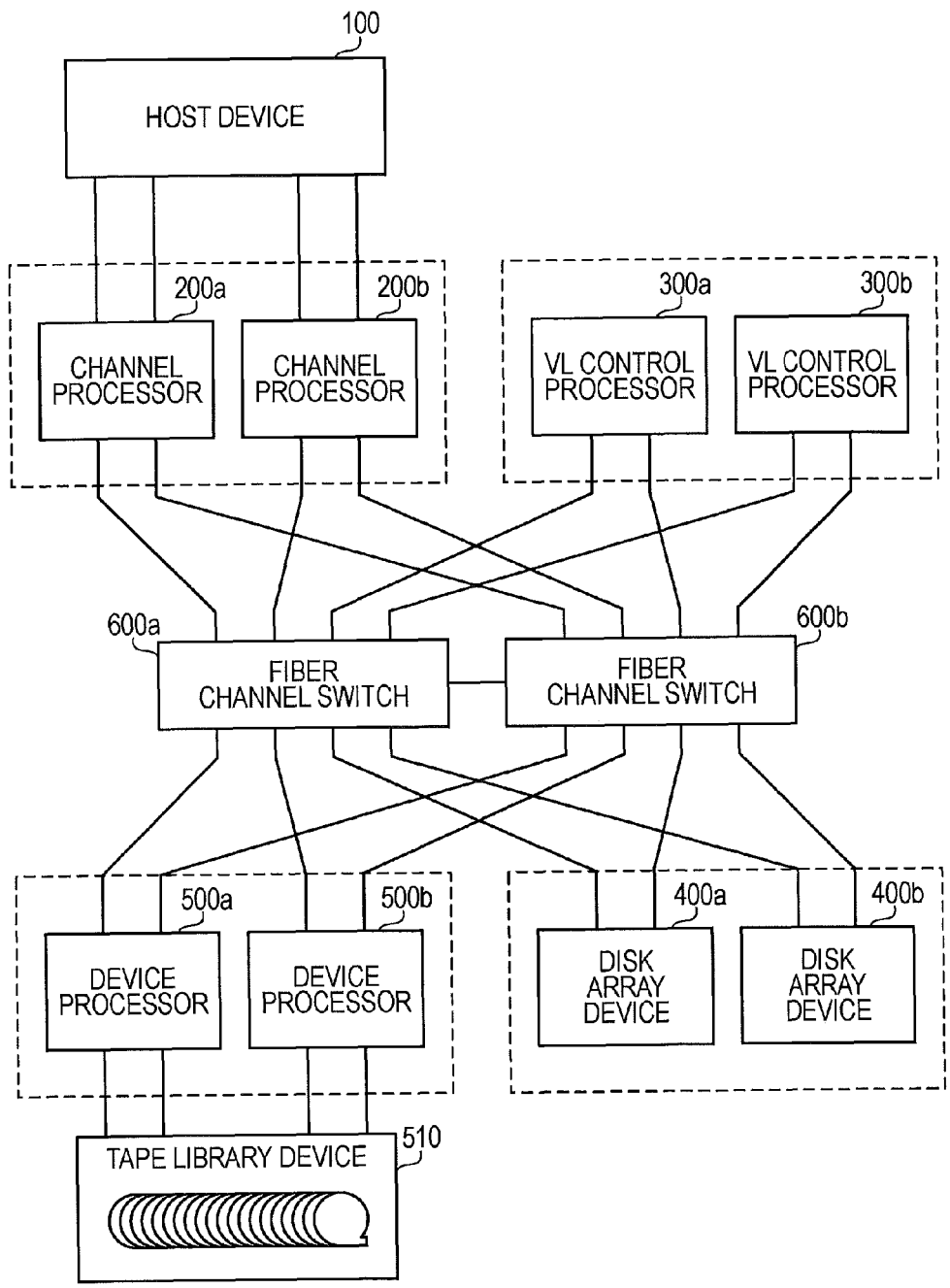
FIG. 2 illustrates a structure of a storage system in accordance with a second embodiment.

FIG. 2 illustrates a structure of a storage system in accordance with a second embodiment.

The storage system of FIG. 2 includes channel processors 200a and 200b, virtual library (hereinafter referred to as VL) control processors 300a and 300b, disk array devices 400a and 400b, and device processors 500a and 500b. These elements are interconnected to each other through optical fiber via fiber channel switches 600a and 600b.

In accordance with the second embodiment, two systems are provided with each system including a channel processor, a VL control processor, a disk array device, and a device processor. For example, the VL control processor 300a and 300b may back up each other.

The channel processors 200a and 200b, the VL control processors 300a and 300b, the disk array devices 400a and 400b, and the device processors 500a and 500b are connected via two connection path systems. One path system is connected via the fiber channel switch 600a and the other path system is connected via the fiber channel switch 600b. The connection path systems increase fault tolerance level.

The host device 100 may be connected to the channel processors 200a and 200b via an optical fiber. The channel processors 200a and 200b provide the host device 100 with an interface function for accessing a virtual library embodied by the storage system.

The virtual library is a large capacity memory area of the tape library device 510 which is connected to the device processors 500a and 500b and which is virtually used by the host device 100 via the disk array devices 400a and 400b. More specifically, a hierarchical storage system is included the disk array devices 400a and 400b as primary storages and the tape library device 510 as a secondary storage.

Upon receiving a data write request from the host device 100, the channel processors 200a and 200b write data of the host device 100 onto one of the disk array devices 400a and 400b under the control of the VL control processor 300a. Upon receiving a data read request from the host device 100, the channel processors 200a and 200b read data of the host device 100 from one of the disk array devices 400a and 400b under the control of the VL control processor 300a. The data read from one of the disk array devices 400a and 400b is then transmitted to the host device 100. A plurality of host devices 100 may be connected to each of the channel processors 200a and 200b.

The VL control processors 300a and 300b manage a data write operation and a data transfer operation in a manner such that the disk array devices 400a and 400b function as the primary storages caching data of the tape library device 510. The VL control processors 300a and 300b control the channel processors 200a and 200b such that the host device 100 may access the virtual library including the primary storages and the secondary storage.

As will be described later, the VL control processors 300a and 300b include a control function such that the host device 100 may access the virtual library even if the disk array devices 400a and 400b is in a faulty state.

Each of the disk array devices 400a and 400b includes a plurality of disks and operates as a primary storage in the virtual library. The disk array devices 400a and 400b are faster in access speed than the tape library device 510, but smaller in memory capacity than the tape library device 510.

The device processors 500a and 500b provide an interface function to access the tape library device 510. The tape library device 510 includes a plurality of tapes, for example, and operates as a secondary storage in the virtual library. The magnetic tape may be supplied in a tape cassette.

The channel processors 200a and 200b, the VL control processors 300a and 300b, and the device processors 500a and 500b may be implemented as computers. The computers may be installed in a single housing.

Figure 3:
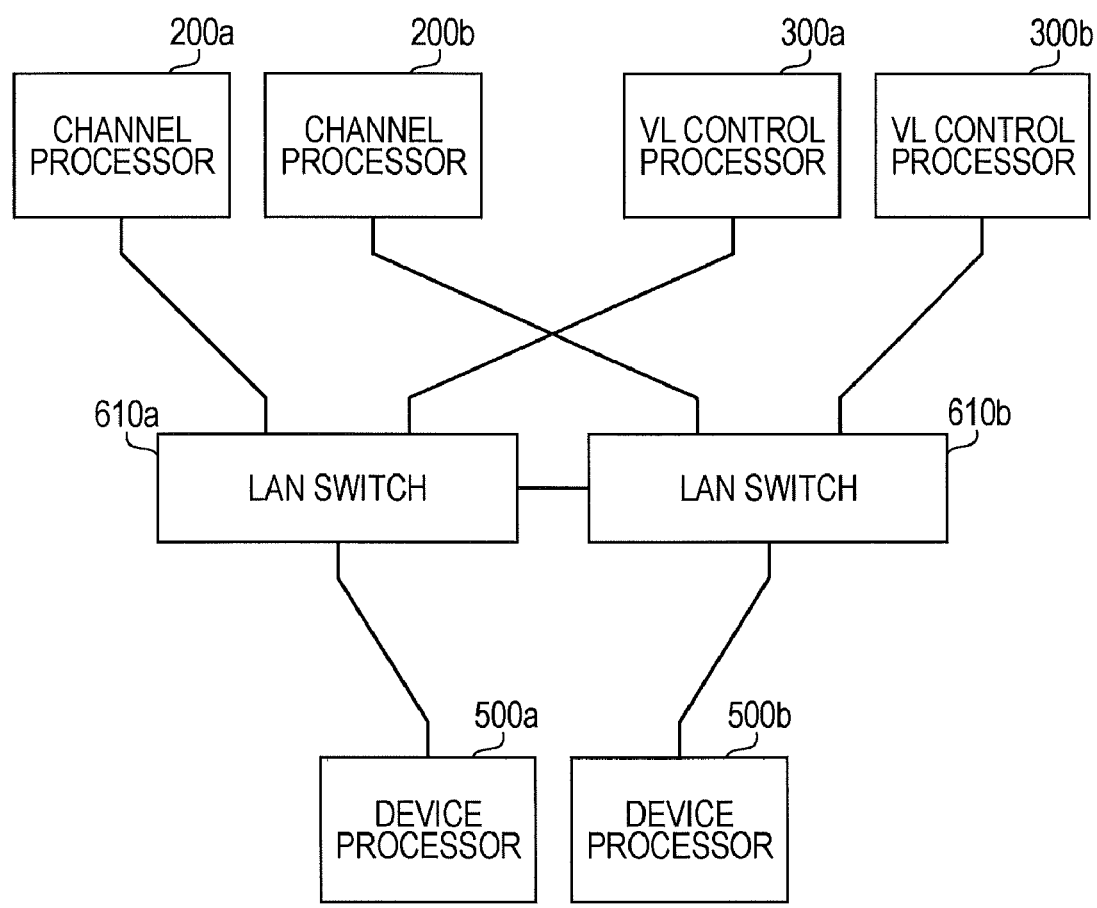
FIG. 3 is a connection diagram illustrating a connection between control processors included in the storage system.

FIG. 3 is a connection diagram of the control processors in the storage system. The channel processors 200a and 200b, the VL control processors 300a and 300b, and the device processors 500a and 500b may be interconnected to each other not only via optical fiber but also via a local-area network (LAN). The processors illustrated in FIG. 3 are connected to a LAN via the LAN switches 610a and 610b. Fault tolerance is increased by redundantizing the connection path system.

In accordance with the second embodiment as will be described later, the virtual library may be continuously operated using the channel processors 200a and 200b, the VL control processors 300a and 300b, and the device processors 500a and 500b even if the disk array devices 400a and 400b fail. For example, a problem on a glass fiber connection path may cause a connection failure between the VL control processors 300a and 300b and the disk array devices 400a and 400b. Although the disk array devices 400a and 400b operate normally, the VL control processors 300a and 300b may erroneously recognize that the disk array devices 400a and 400b fail. A connection path other than the optical fiber, if arranged as illustrated in FIG. 3, allows the channel processors 200a and 200b, the VL control processors 300a and 300b, and the device processors 500a and 500b to cause the virtual library to be continuously and reliably operative.

The optical fiber may be used to transfer write data or read data. The LAN may be used to transfer control data among control processors. If the optical fiber connection path fails, the write data or the read data may be transferred via the LAN. Fault tolerance is thus increased.

Referring to FIG. 3, the control processors in one system, i.e., the channel processor 200a, the VL control processor 300a, and the device processor 500a are interconnected to each other via the LAN switch 610a. The control processors on the other system, i.e., the channel processor 200b, the VL control processor 300b, and the device processor 500b are interconnected to each other via the LAN switch 610b.

The structure and function of the devices in the storage system are described below. In the following discussion, for simplicity of explanation, the channel processors 200a and 200b are collectively referred to as a "channel processor 200," the VL control processors 300a and 300b as a "VL control processor 300," the disk array devices 400a and 400b as a "disk array device 400," and the device processors 500a and 500b as a "device processor 500."

Figure 4:
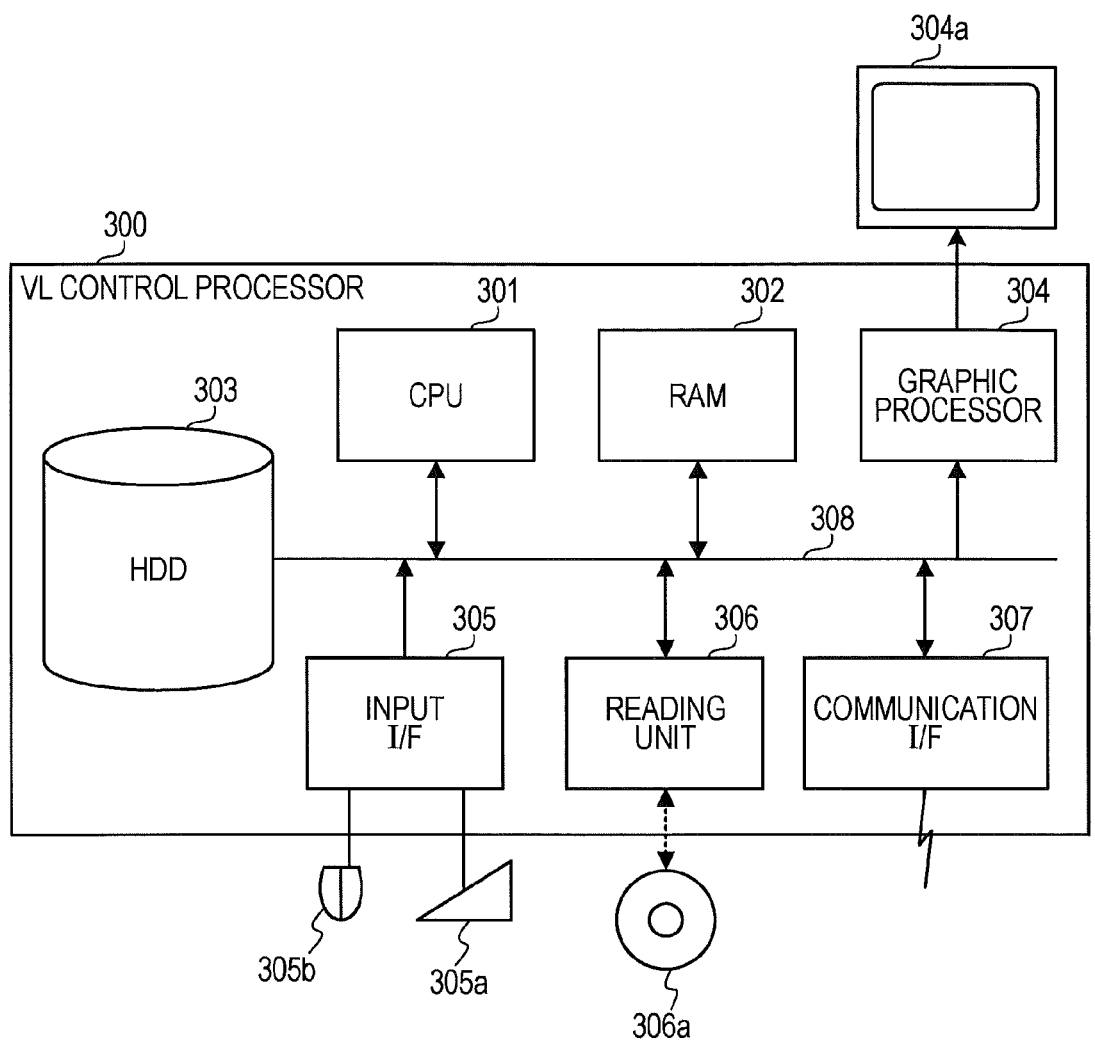
FIG. 4 illustrates a hardware structure of a VL control processor.

FIG. 4 illustrates a hardware structure of the VL control processor 300.

The VL control processor 300 is implemented using a computer as illustrated in FIG. 4. The computer includes CPU 301, random-access memory (RAM) 302, HDD 303, graphic processor 304, input interface (I/F) 305, reading unit 306, and communication interface (I/F) 307. These elements are interconnected to each other via a bus 308.

The CPU 301 generally controls the computer by executing a program stored on the HDD 303. The RAM 302 stores temporarily at least part of the program to be executed by the CPU 301 and a variety of data needed in the process executed in accordance with the program. The HDD 303 stores the program to be executed by the CPU 301, and a variety of data needed in the process executed in accordance with the program.

A monitor 304a is connected to the graphic processor 304. The graphic processor 304 displays an image on the screen of the monitor 304a in accordance with an instruction from the CPU 301. A keyboard 305a and a mouse 305b are connected to the input interface 305. The input interface 305 transfers signals from the keyboard 305a and the mouse 305b to the CPU 301 via the bus 308.

The reading unit 306 reads data from a portable recording medium 306a, and transfers the read data to the CPU 301 via the bus 308. The recording medium 306a may be an optical disk, for example. The communication interface 307 may be connected to each of the external devices such as the channel processor 200, the disk array device 400, and the device processor 500 via a connector (not illustrated), and may exchange data with the external devices.

The host device 100, the channel processor 200, and the device processor 500 are designed using the same hardware structure as that of the VL control processor 300 illustrated in FIG. 4.

Figure 5:
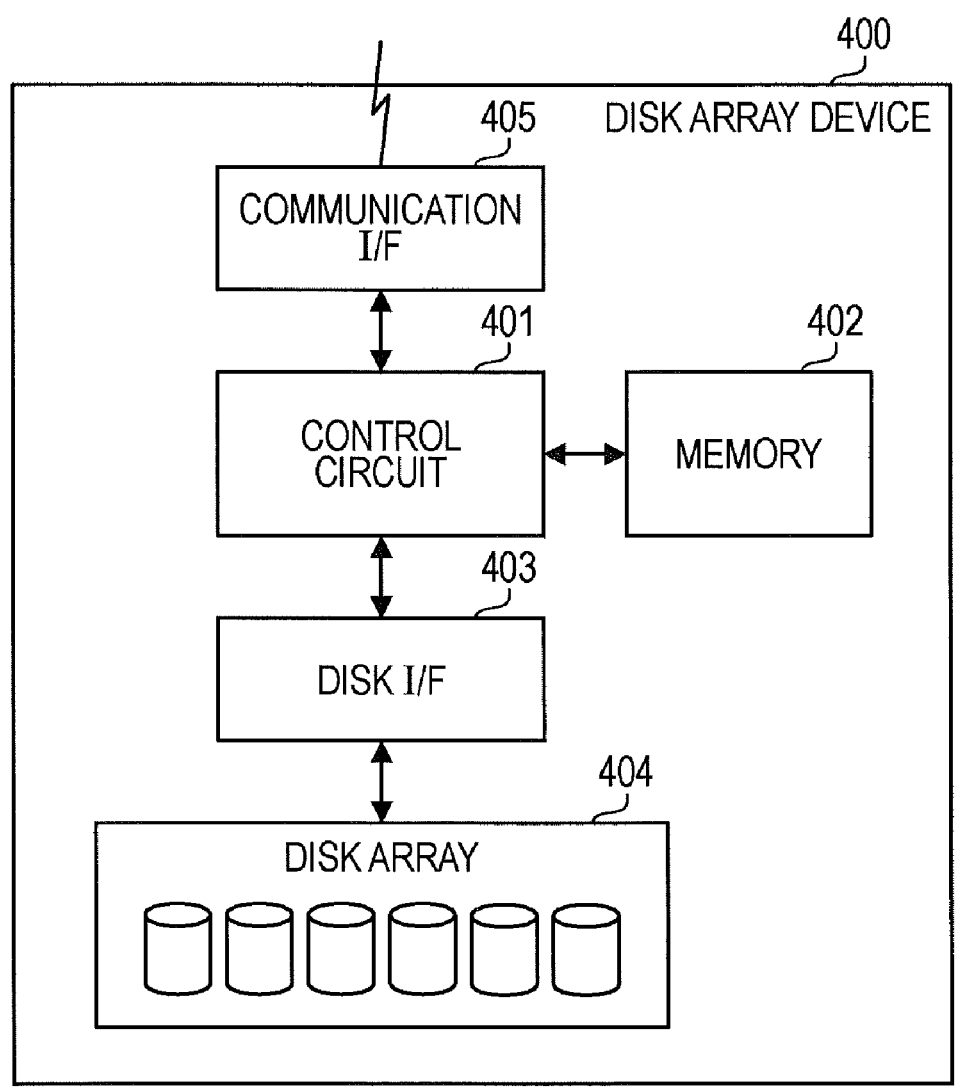
FIG. 5 illustrates a hardware structure of a disk array device.

FIG. 5 illustrates a hardware structure of the disk array device 400. The disk array device 400 includes control circuit 401, memory 402, disk interface 403, disk array 404, and communication interface 405.

The control circuit 401 generally controls the disk array device 400. The memory 402 stores a variety of data used for the process of the control circuit 401. In response to a request from the control circuit 401, the disk interface 403 writes data onto the disk array 404, and read data from the disk array 404.

The disk array 404 includes an array of magnetic disks. The communication interface 405 may be connected to each of the external devices such as the channel processor 200, the VL control processor 300, and the device processor 500 via a connector (not illustrated), and may exchange data with the external devices.

Figure 6:
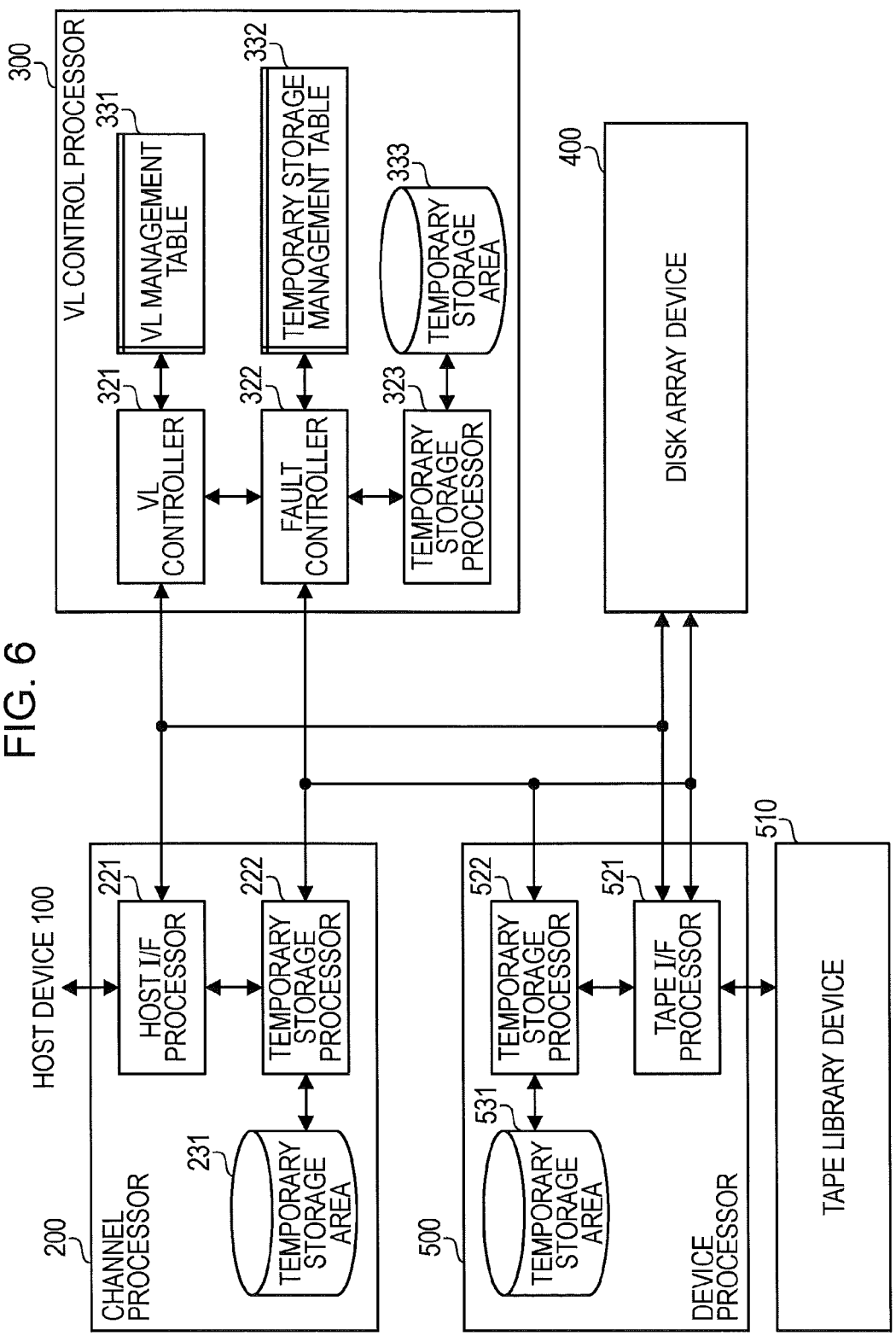
FIG. 6 is a functional block diagram of the control processors in the storage system.

FIG. 6 illustrates a function of each control processor in the storage system.

The VL control processor 300 includes VL controller 321, fault controller 322, and temporary storage processor 323. The functions of these elements may be executed when a CPU in the VL control processor 300 executes a specific program.

Referencing a VL management table 331, the VL controller 321 controls a write operation and a transfer operation of basic data in the virtual library. As will be described later, the VL management table 331 stores information that maps a storage area on the tape library device 510 serving as a secondary storage to a storage area on the disk array device 400 serving as a primary storage. The VL management table 331 further stores information. The information is used for determining whether the data on the tape library device 510 mapped to the data on the disk array device 400 is updated data.

In the event of a fault in the disk array device 400, the fault controller 322 controls an operation to cause the virtual library to continuously operate. During the occurrence of the fault, the fault controller 322 temporarily stores read requested data or write requested data onto one of the temporary storage areas 231, 333, and 531 respectively set up in the channel processor 200, the VL control processor 300, and the device processor 500. After a recovery from the fault, the fault controller 322 restores the virtual library to the normal operating state using the data stored on the temporary storage area. Using a temporary storage management table 332, the fault controller 322 manages data stored on the temporary storage management table for each processor.

The VL management table 331 and the temporary storage management table 332 may be stored on a storage area of a non-volatile storage device such as an HDD and a RAM in the VL control processor 300. These tables may be stored on an external device.

In the event of a fault in the disk array device 400, the temporary storage processor 323 writes data onto the temporary storage area 333 and reads data from the temporary storage area 333 in response to a request from the fault controller 322. For example, part of a storage area of a non-volatile storage device such as an HDD and a RAM in the VL control processor 300 may be assigned to the temporary storage area 333. Such a storage area may be set up as a memory area having a specific memory capacity, or may be dynamically set up by the temporary storage processor 323.

The channel processor 200 includes a host interface (I/F) processor 221 and a temporary storage processor 222. The functions of these elements may be performed when a CPU in the channel processor 200 executes a specific program.

The host interface processor 221 receives a data read request or a data write request from the host device 100. Under the control of the VL controller 321 in the VL control processor 300, the host interface processor 221 accesses the disk array device 400 and executes the data write operation and the data read operation.

In the event of a fault in the disk array device 400, the temporary storage processor 222 writes data onto the temporary storage area 231 or reads data from the temporary storage area 231 in response to a request from the fault controller 322 in the VL control processor 300. Part of a storage area of a non-volatile storage device such as an HDD and a RAM in the channel processor 200 is assigned to the temporary storage area 231. Such a storage area may be set up as an area having a specific memory capacity, or may be dynamically set up by the temporary storage processor 222.

The device processor 500 includes a tape interface (I/F) processor 521 and a temporary storage processor 522.

The functions of these elements may be performed when a CPU in the device processor 500 executes a specific program.

The tape interface processor 521 writes data onto a magnetic tape on the tape library device 510 or reads data from a magnetic tape on the tape library device 510 in response to a request from the channel processor 200 and the VL control processor 300.

In the event of a fault in the disk array device 400, the temporary storage processor 522 writes data onto the temporary storage area 531 or reads data from the temporary storage area 531 in response to a request the fault controller 322 in the VL control processor 300. Part of a storage area of a non-volatile storage device such as an HDD and a RAM in the device processor 500 is assigned as the temporary storage area 531. Such a storage area may be set up as an area having a specific memory capacity, or may be dynamically set up by the temporary storage processor 522.

FIG. 7 illustrates an example of data to be stored on the VL management table 331.

The VL management table 331 stores information that maps a storage area on the tape library device 510 to a storage area on the disk array device 400. Referring to FIG. 7, the information includes a physical volume representing the storage area on the tape library device 510, and a logical volume and an address respectively representing a virtual storage area and a storage location of the data on the disk array device 400. One physical volume corresponds to one tape cassette. As illustrated in FIG. 7, a plurality of logical volumes may be assigned to one physical volume.

The VL management table 331 further stores a data status indicating a status of data on an area managed by one address. One of "Dirty," "Hit," and "Miss" is set as a data status.

The "Dirty" status indicates that updated data is stored on the disk array device 400 while the corresponding data on the tape library device 510 is not updated. The "Hit" status indicates that the data on the disk array device 400 is identical to the data on the tape library device 510. The "Miss" status indicates that no data is assigned on the disk array device 400 and that data is recorded on the tape library device 510 only.

Figure 8:
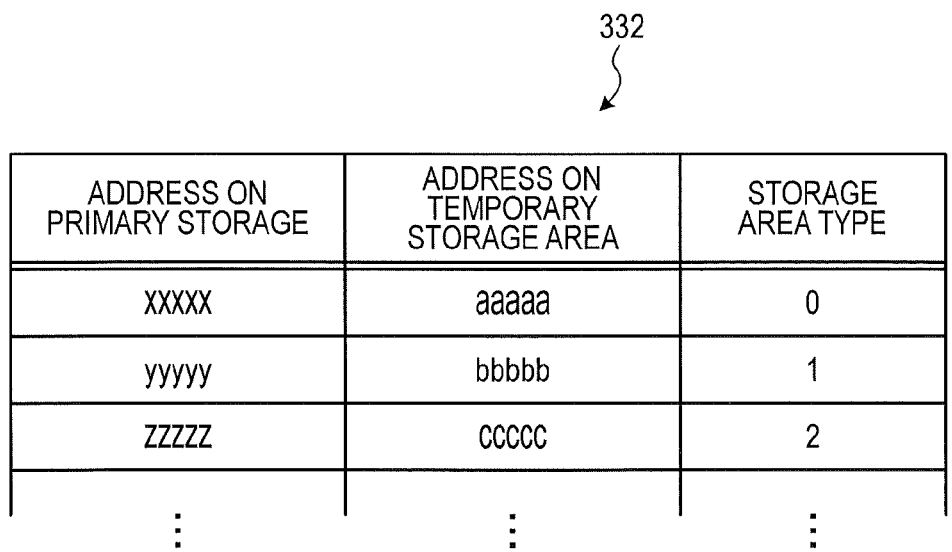
FIG. 8 illustrates an example of data stored on a temporary storage management table.

FIG. 8 illustrates an example of data to be stored on the temporary storage management table 332.

The temporary storage management table 332 stores information for managing data stored on the temporary storage areas 231, 333, and 531. Referring to FIG. 8, an address of the data on the temporary storage area, and a storage area type identifying the temporary storage area are mapped to an address on the disk array device 400 as a primary storage. The storage area type identifies a control processor on which the temporary storage area storing the data is set up. In accordance with the second embodiment, the storage area type identifies which of the temporary storage areas 231, 333, and 531 stores the data.

The address on the disk array device 400 recorded on the temporary storage management table 332 corresponds to the address recorded on the VL management table 331. Information of the address on the temporary storage area and the storage area type may be stored on the column of the address in the VL management table 331. The temporary storage area may be managed using only the VL management table 331 without using the temporary storage management table 332.

FIGS. 9-13 are flowcharts of a process of the storage system.

Figure 9:
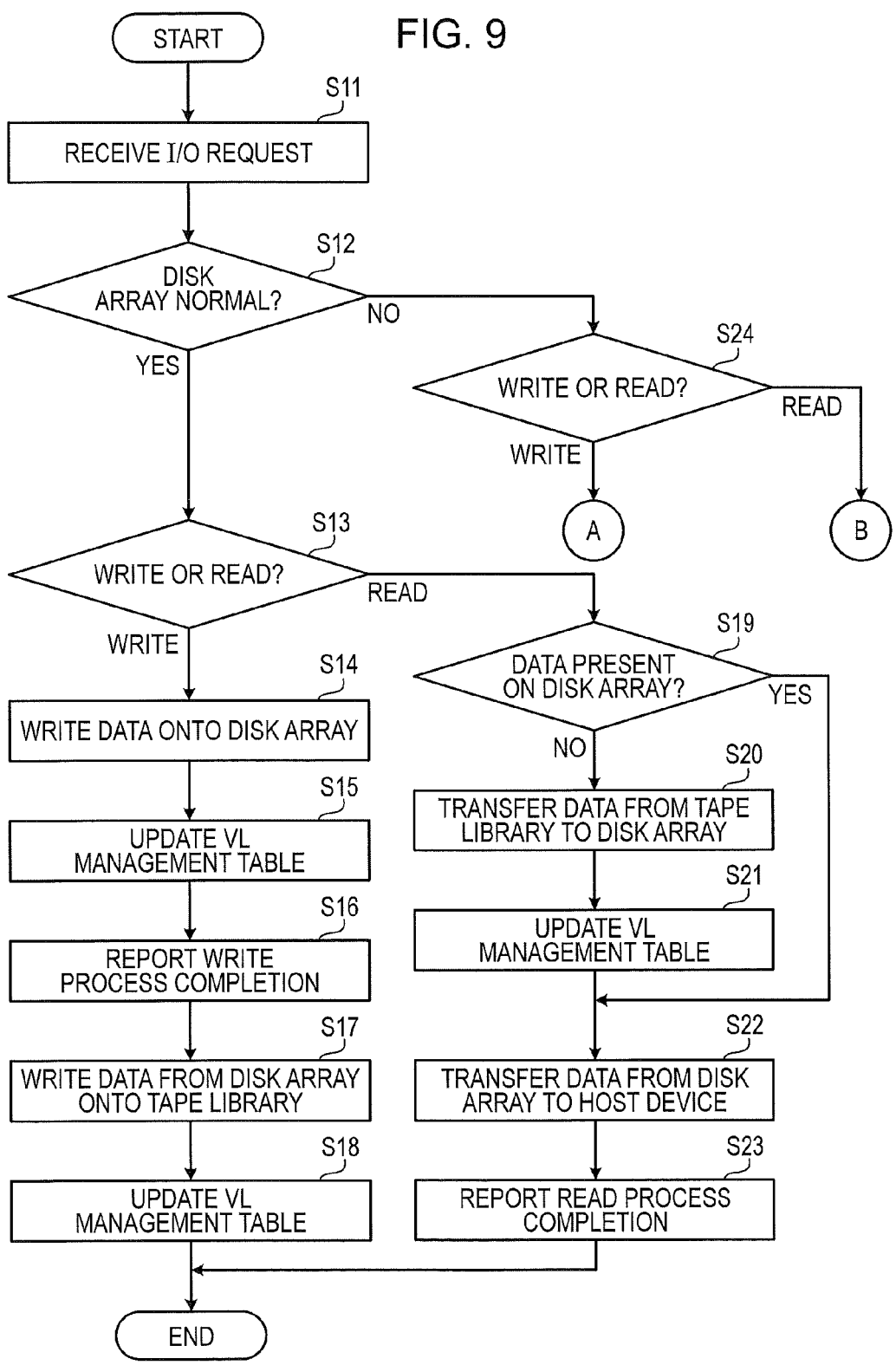
FIG. 9 is a flowchart of a process of the storage system.

A process performed with no fault occurring on the disk array device 400 is described with reference to FIG. 9.

In operation S11, the host device 100 outputs an I/O (input/output) request, and the host interface processor 221 in the channel processor 200 receives the I/O request. The host interface processor 221 notifies the VL controller 321 in the VL control processor 300 that the host interface processor 221 has received the I/O request.

In operation S12, the VL controller 321 determines whether the disk array device 400 is operating normally. If the disk array device 400 is operating normally, operation S13 is executed. If the disk array device 400 is not operating normally, the VL controller 321 notifies the fault controller 322 of the occurrence of a fault. Operation S24 is then executed.

A determination process in operation S12 may be performed by the VL controller 321. More specifically, upon receiving a reception notification of the I/O request from the host interface processor 221, the VL controller 321 inquires of the disk array device 400. Alternatively, the VL controller 321 periodically inquires of the disk array device 400.

The cases that the disk array device 400 malfunctions include a faulty operation of the disk array device 400 itself, and a communication failure with the disk array device 400 caused by a faulty connection path.

In operation S13, the VL controller 321 determines based on the notification from the host interface processor 221 whether the I/O request from the host device 100 is either a write request or a read request. If the I/O request is a write request, operation S14 is executed. If the I/O request is a read request, operation S19 is executed.

In operation S14, the data write requested by the host device 100 is written onto the disk array device 400. In this operation, the VL controller 321 notifies the host interface processor 221 of a write address of the data on the disk array device 400. The host interface processor 221 writes the data from the host device 100 onto the notified write address.

In operation S15, the VL controller 321 updates the VL management table 331 in response to the reception of a data write completion notification from the host interface processor 221. For example, the VL controller 321 sets the "Dirty" status on the data status corresponding to the data written address. When the update process of the VL management table 331 is complete, the VL controller 321 outputs a process completion notification to the host interface processor 221.

In operation S16, the host interface processor 221 receives the process completion notification from the VL controller 321 and notifies the host device 100 that the write process has been completed.

In operation S17, the data written on the disk array device 400 in operation S14 is also written onto the tape library device 510. In this operation, the VL controller 321 first references the VL management table 331 and retrieves the data written address on the disk array device 400 and the physical volume on the tape library device 510 as a write destination. The VL controller 321 then notifies the tape interface processor 521 in the device processor 500 of these pieces of information. The tape interface processor 521 reads the data from the notified address on the disk array device 400 and then writes the read data onto an area corresponding to the notified physical volume on the tape library device 510.

The operation in S17 may be executed at any timing after the completion of operation S15.

In operation S18, the VL controller 321 updates the VL management table 331 in accordance with the results of the operation S17. For example, the "Hit" status is set to the corresponding data status. A series of process operations performed in response to the data write request from the host device 100 is thus completed.

In operation S19, the VL controller 321 references the VL management table 331 and determines whether the data read requested by the host device 100 is cached on the disk array device 400. If the data status corresponding to the requested data is "Hit" or "Dirty," the data is considered to be cached. If the data is cached on the disk array device 400, operation S22 is executed. If the data is not cached on the disk array device 400, operation S20 is executed.

In operation S20, the VL controller 321 request the tape interface processor 521 in the device processor 500 to read from the tape library device 510 the data requested by the host device 100, and to transfer the read data to the address specified on the disk array device 400. The tape interface processor 521 reads the data from the tape library device 510 and writes the read data onto the address specified on the disk array device 400.

In operation S21, the VL controller 321 updates the VL management table 331 in accordance with the process results in operation S20. The "Hit" status is set for the data status corresponding to the address on the disk array device 400 having recorded the data.

In operation S22, the data requested by the host device 100 is read from the disk array device 400 and then transferred to the host device 100. In this operation, the VL controller 321 first retrieves from the VL management table 331 the address having the requested data written thereon, and notifies the host interface processor 221 in the channel processor 200 of the address. The host interface processor 221 reads the data from the notified address on the disk array device 400, and then transmits the read data to the host device 100. When the data transmission is complete, the host interface processor 221 outputs to the VL controller 321a data read completion notification.

In operation S23, the VL controller 321 outputs to the host interface processor 221a process completion notification. In response to the process completion notification, the host interface processor 221 notifies the host device 100 of the completion of the read process. This completes a series of process operations performed in response to the data read request from the host device 100.

Figure 10:
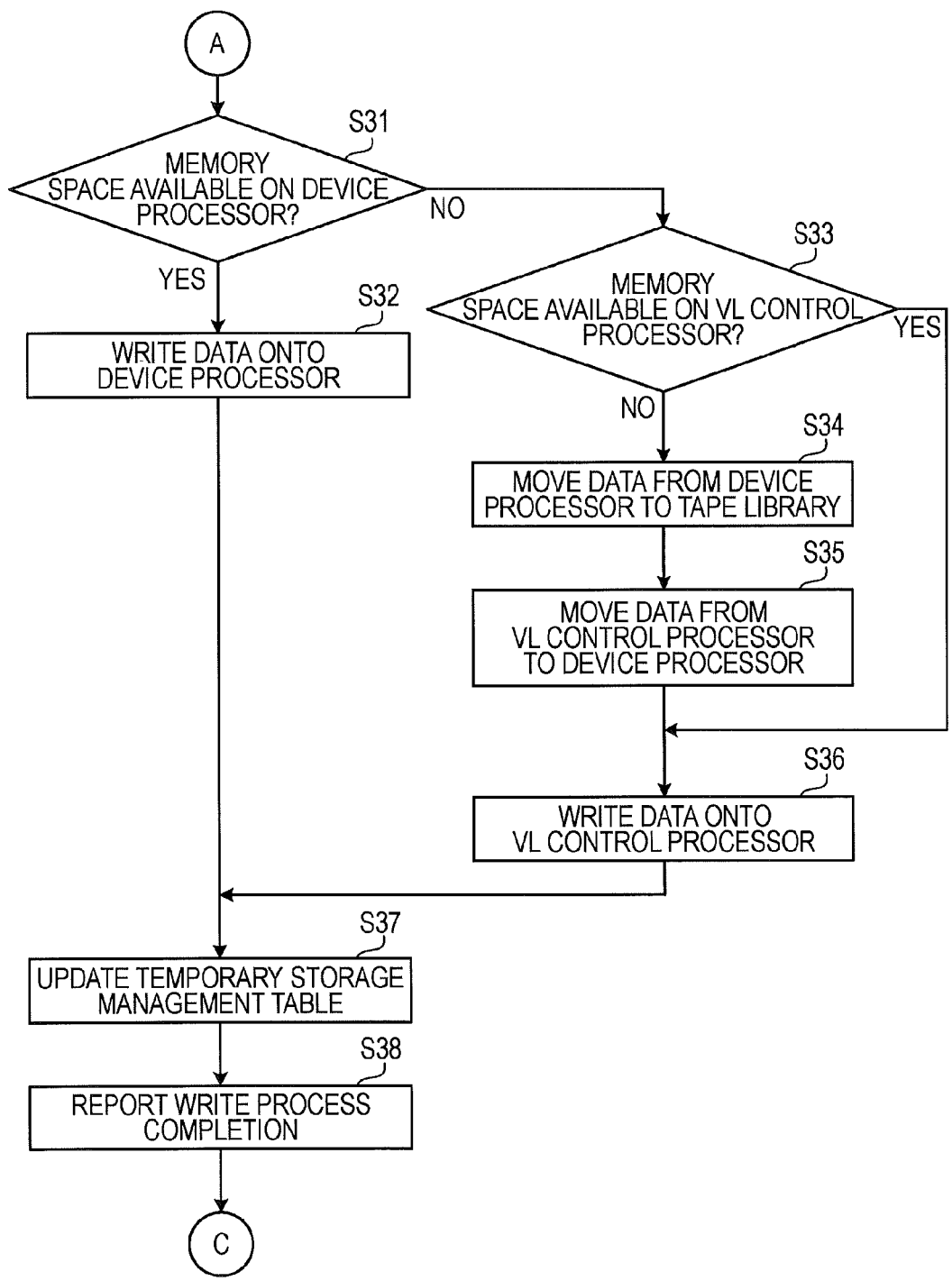
FIG. 10 is a continuation of the flowchart of FIG. 9.
Figure 12:
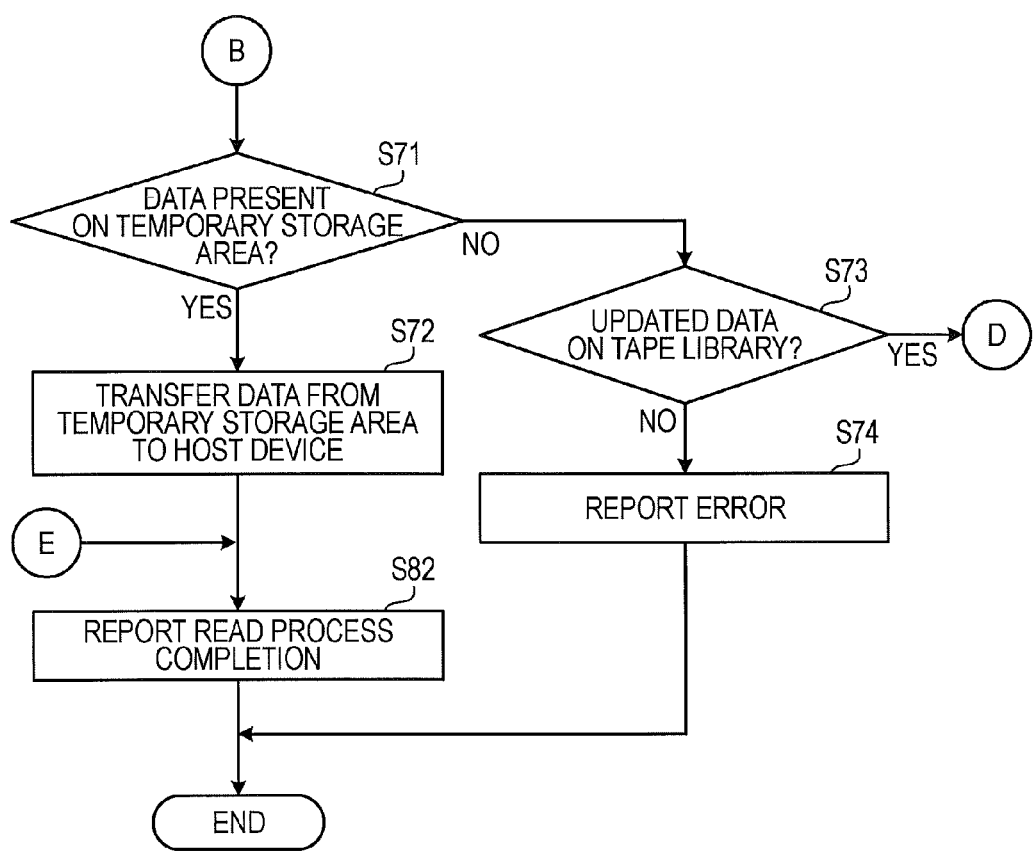
FIG. 12 is a continuation of the flowchart of FIG. 9.

In operation S24, the VL controller 321 determines in response to a notification from the host interface processor 221 whether the I/O request from the host device 100 is a write request or a read request. If the I/O request is a write request, operation S31 of FIG. 10 is executed. If the I/O request is a read request, operation S71 of FIG. 12 is executed.

A process performed in response to a write request from the host device 100 with the disk array device 400 in a faulty state is described with reference to FIG. 10.

In operation S31, the fault controller 322 in the VL control processor 300 queries the temporary storage processor 522 in the device processor 500 to determine whether an empty memory space is available on the temporary storage area 531 in the device processor 500. If an empty memory space is available on the temporary storage area 531, operation S32 is executed. If no empty memory space is available on the temporary storage area 531, operation S33 is executed.

In order to determine whether an empty memory space is available or not, the fault controller 322 may reference the number of pieces of registered information on a per temporary storage area basis on the temporary storage management table 332.

In operation S32, the data write requested by the host device 100 is written on the temporary storage area 531 in the device processor 500.

In this operation, the fault controller 322 first retrieves an address of an empty area in the temporary storage area 531 from the temporary storage processor 522 in the device processor 500. The temporary storage processor 522 may reserve as the temporary storage area 531a present empty area on a storage device (such as an HDD and a RAM) for the device processor 500 and then transfers an address of the empty area to the fault controller 322.

The fault controller 322 notifies the temporary storage processor 222 in the channel processor 200 of the address retrieved from the temporary storage processor 522. The temporary storage processor 222 receives the write data from the host device 100 via the host interface processor 221. The temporary storage processor 222 transfers to the temporary storage processor 522 in the device processor 500 the write data together with the notified address from the fault controller 322, and requests the temporary storage processor 522 to store the write data on the temporary storage area 531. The temporary storage processor 522 writes the data on a corresponding area on the temporary storage area 531.

Upon completing the write process, the temporary storage processor 522 notifies the temporary storage processor 222 in the channel processor 200 of a write completion notification. In response to the write completion notification, the temporary storage processor 222 notifies the fault controller 322 of the write completion. Operation S37 is then executed.

In operation S33, the fault controller 322 queries the temporary storage processor 323 to determine whether an empty memory space is available on the temporary storage area 333 in the VL control processor 300. If an empty memory space is available on the temporary storage area 333, operation S36 is executed. If no empty memory space is available on the temporary storage area 333, operation S34 is executed.

In operation S34, the fault controller 322 references the temporary storage management table 332. If data is already stored on the temporary storage area 531 in the device processor 500, the data is moved to the tape library device 510. Under the control of the fault controller 322, the temporary storage processor 522 in the device processor 500 moves the data from the temporary storage area 531 to the tape library device 510. In this way, an empty area is generated in the storage device of the device processor 500. The fault controller 322 then deletes information relating to the data on the temporary storage area 531 moved from the temporary storage management table 332 to the tape library device 510. The VL controller 321 sets the data status on the VL management table 331 corresponding to the data stored on the tape library device 510 to the "Miss" status.

In operation S35, the fault controller 322 references the temporary storage management table 332. If data is already stored on the temporary storage area 333 in the VL control processor 300, the fault controller 322 reads the data via the temporary storage processor 323. The fault controller 322 transfers the data to the temporary storage processor 522 in the device processor 500 and causes the temporary storage area 531 to store the data. In this way, an empty area is caused on the VL control processor 300. The fault controller 322 then updates on the temporary storage management table 332 the address and the storage area type corresponding to the data stored on the temporary storage area 531.

In operation S36, the fault controller 322 retrieves the data write requested by the host device 100 via the temporary storage processor 222 in the channel processor 200. The fault controller 322 then transfers the retrieved data to the temporary storage processor 323 to store the data onto the temporary storage area 333. When the write process on the temporary storage area 333 is complete, the fault controller 322 notifies the temporary storage processor 222 in the channel processor 200 of a write completion notification. In response to the write completion notification, the temporary storage processor 222 notifies the fault controller 322 of the write completion. Operation S37 is then executed.

In operation S37, the fault controller 322 receives the write completion notification, and updates the temporary storage management table 332. In this operation, the fault controller 322 registers in the temporary storage management table 332 an address on the primary storage, an address on the temporary storage area, and a storage area type. If operation S32 has been executed, the address on the temporary storage area 531 in the device processor 500 is registered on the temporary storage management table 332. In contrast, if operation S36 has been executed, the address of the temporary storage area 333 in the VL control processor 300 is registered on the temporary storage management table 332. Subsequent to these processes, the VL controller 321 outputs a process completion notification to the host interface processor 221.

Figure 11:
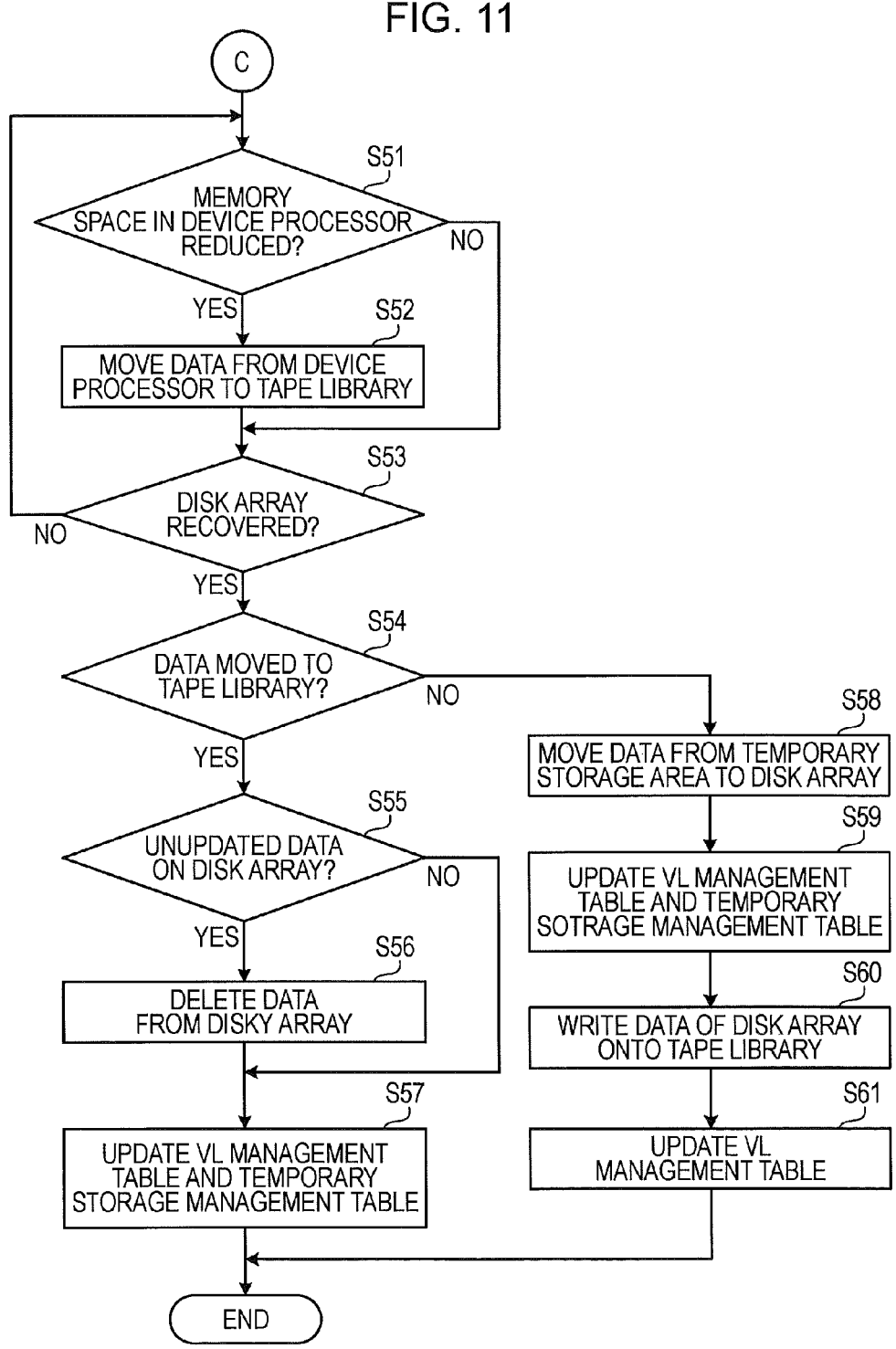
FIG. 11 is a continuation of the flowchart of FIG. 10.

Upon receiving the process completion notification from the VL controller 321 in operation S38, the host interface processor 221 notifies the host device 100 of the write process completion. Operation S51 illustrated in FIG. 11 is then executed.

If the write request is received from the host device 100 in the process illustrated in FIG. 10, the write requested data is stored onto the temporary storage area 531 in the device processor 500 (S31 and S32). The data written on the temporary storage area 531 may be later written onto the tape library device 510. In such a case, this process is intended to write the data onto the tape library device 510 in the shortest possible time.

If no empty memory space is available on the device processor 500, data is stored on the temporary storage area 333 in the VL control processor 300 (S31, S33, and S36). If no empty memory space is available on the VL control processor 300, a memory space is generated on the device processor 500 (S34). The data on the temporary storage area 333 in the VL control processor 300 is moved to the memory space (S35). The write requested data is then stored on the memory space generated on the VL control processor 300 (S36).

A process performed when the disk array device 400 is recovered from a faulty state is described below with reference to FIG. 11.

In operation S51, the remaining memory space of the storage device of the device processor 500 is reduced if data is recorded on the memory device of the device processor 500 in another type of process after the data is stored on the temporary storage area 531 in operations S32 and S35. The fault controller 322 then determines whether the remaining memory space of the storage device of the device processor 500 falls below a specific value. For example, this determination operation is performed in response to a notification from the temporary storage processor 522 in the device processor 500. If the remaining memory space of the storage device falls below the specific value, operation S52 is executed. If the remaining memory space of the storage device does not fall below the specific value, operation S53 is executed.

In operation S52, the fault controller 322 controls the temporary storage processor 522 in the device processor 500, thereby causing the temporary storage processor 522 to move the data from the temporary storage area 531 to the tape library device 510. The temporary storage processor 522 reads the corresponding data from the temporary storage area 531, transfers the read data to the tape interface processor 521, and requests the tape interface processor 521 to write the data on the tape library device 510.

In operation S53, the fault controller 322 determines whether the disk array device 400 has recovered from the faulty state. If the disk array device 400 has recovered from the faulty state, operation S54 is executed. If the disk array device 400 has not yet recovered from the faulty state, operation S51 is executed.

A process loop of operations S51-S53 is cycled through every specific period of time. If one of a new write request and a new read request is issued from the host device 100 before it is determined in operation S53 that the disk array device 400 has recovered from the faulty state, the process of FIG. 9 is repeated again.

In operation S54, the fault controller 322 determines whether the data has already been moved from the temporary storage area 531 in the device processor 500 to the tape library device 510 with operation S52 executed. If the data has been moved from the temporary storage area 531, operation S55 is executed. If the data has not been moved from the temporary storage area 531, operation S58 is executed.

In operation S55, the fault controller 322 queries the VL controller 321 to determine whether unupdated data corresponding to the data moved to the tape library device 510 is recorded on the disk array device 400. The VL controller 321 replies to this query by referencing the VL management table 331. If the unupdated data is recorded on the disk array device 400, operation S56 is executed. If the unupdated data is not recorded on the VL management table 331, operation S57 is executed.

In operation S56, the fault controller 322 deletes the unupdated data from the disk array device 400. This is because a relatively long period of time is consumed if the updated data is to be read from the tape library device 510 in order to update information on the disk array device 400.

In operation S57, the VL controller 321 and the fault controller 322 update information of the VL management table 331 and the temporary storage management table 332, respectively. The data moved to the tape library device 510 is set to the "Miss" status on the VL management table 331. Registered information related to the data on the temporary storage area 531 moved to the tape library device 510 is deleted from the temporary storage management table 332.

In operation S58, the fault controller 322 moves write requested data from the temporary storage areas 531 and 333 to the disk array device 400. The fault controller 322 controls the temporary storage processor 522 in the device processor 500, thereby moving the data from the temporary storage area 531 to the disk array device 400. The data stored on the temporary storage area 333 is read via the temporary storage processor 323 and then moved to the disk array device 400. Old data corresponding to the write requested data, if stored on the disk array device 400, is updated with the data from the temporary storage areas 531 and 333.

In operation S59, the VL controller 321 and the fault controller 322 update information on the VL management table 331 and the temporary storage management table 332, respectively. The data moved to the disk array device 400 is set to the "Dirty" status on the VL management table 331. Information related to the data of the temporary storage area 531 or the temporary storage area 333 moved to the disk array device 400 is deleted from the temporary storage management table 332.

In operation S60, the data moved to the disk array device 400 in operation S58 is also written onto the tape library device 510. This operation is executed in the same manner as previously described with reference to operation S17. Operation S60 is executed at any timing after the completion of operation S59.

In operation S61, the VL controller 321 updates the VL management table 331 in accordance with the results of the process in operation S160. The data written on the tape library device 510 is set to the "Hit" status.

Through the process illustrated in FIG. 11, the data stored on the temporary storage area 531 in the device processor 500 is moved to one of the disk array device 400 and the tape library device 510, and the virtual library resumes the normal operation. If the disk array device 400 has recovered from the faulty state in this process, the data stored on the temporary storage area is written on the tape library device 510 after being moved to the disk array device 400 (S58-S61).

The data on the temporary storage area may be moved to the tape library device 510 before the disk array device 400 recovers from the fault. In such a case, the data is prevented from being written onto the disk array device 400 such that no drop takes place in the process speed. In the process illustrated in FIG. 11, the data on the temporary storage area is moved to the tape library device 510 before the disk array device 400 recovers from the faulty state. Such an operation is performed if the remaining memory space of the control processor having the temporary storage area is reduced.

If the data is stored on the temporary storage area 333 in the VL control processor 300 with the disk array device 400 recovered from the faulty state, the fault controller 322 may simply move the data to the disk array device 400 (although this processes not illustrated). If the remaining memory space of the storage device of the VL control processor 300 is reduced after the data is stored onto the temporary storage area 333, the data may be moved from the temporary storage area 333 to the tape library device 510. In such a case, the moved data is set to the "Miss" status and registration information corresponding to the moved data is deleted on the VL management table 331.

Even if the disk array device 400 fails, the process illustrated in FIGS. 10 and 11 allows the virtual library to be continuously operative without missing the data write requested by the host device 100. Since the write data is temporarily stored on the existing storage area within the system, there is no need to arrange a new dedicated storage device for storage purposes. No increase is caused in the manufacturing cost and the installation space of the storage device. A low-cost and high reliability system thus results.

Figure 13:
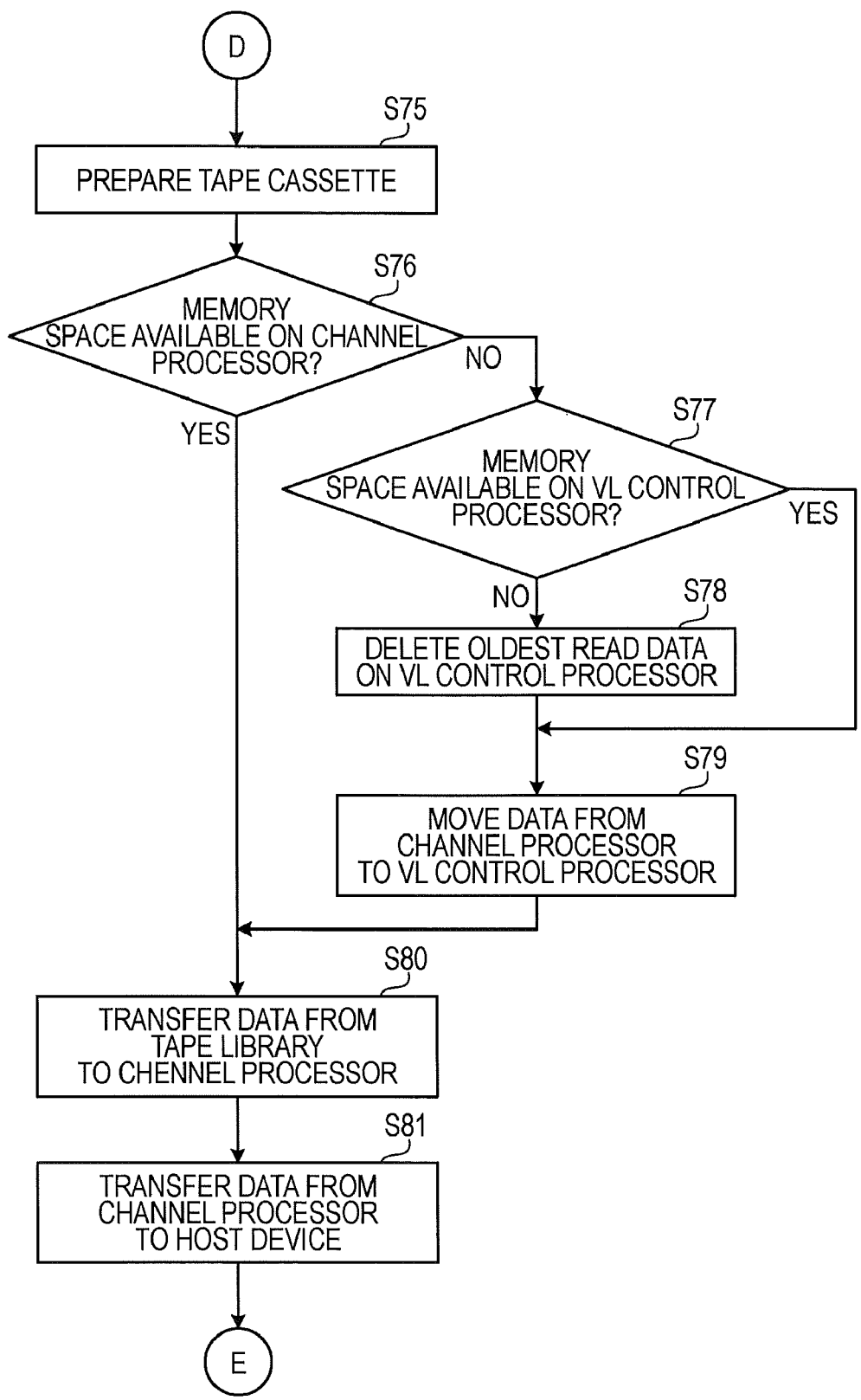
FIG. 13 is a continuation of the flowchart of FIG. 12.

Referring to FIGS. 12 and 13, a process performed in response to a read request from the host device 100 during the occurrence of a fault in the disk array device 400 is described below.

In operation S71, the fault controller 322 searches a temporary storage area with data loaded thereon by referencing the temporary storage management table 332 and determines whether read requested data is stored on the temporary storage area. In this case, the fault controller 322 searches the temporary storage area 231 in the channel processor 200 and the temporary storage area 333 in the VL control processor 300 to determine whether the data is stored there. If the data is stored, the data is data read requested by the host device 100 prior to operation S71 and then read from the tape library device 510. The VL control processor 300 renders the data stored on the temporary storage area 333 readily identifiable as to whether the data is read requested or write requested.

If the data is stored on the temporary storage area, operation S72 is executed. If no data is stored on the temporary storage area, operation S73 is executed.

In operation S72, the data stored on the temporary storage area is transmitted to the host device 100.

If the data is stored on the temporary storage area 231 in the channel processor 200, the fault controller 322 requests the temporary storage processor 222 in the channel processor 200 to read the data from the temporary storage area 231 and to transfer the read data to the host device 100. The temporary storage processor 222 reads the read requested data from the temporary storage area 231, transfers the read data to the host interface processor 221, and causes the host interface processor 221 to transmit the data to the host device 100. When the data is transmitted to the host device 100, the temporary storage processor 222 transfers a completion notification of the data transmission to the fault controller 322.

If the data is stored on the temporary storage area 333 in the VL control processor 300, the fault controller 322 retrieves the data via the temporary storage processor 323. The fault controller 322 transfers the retrieved data to the temporary storage processor 222 in the channel processor 200 and then requests the temporary storage processor 222 to transmit the data to the host device 100. In a similar manner as described above, the data is transmitted from the host interface processor 221 to the host device 100. A completion notification of the data transmission is transmitted to the fault controller 322. Operation S82 is then executed.

In operation S73, the fault controller 322 queries the VL controller 321 to determine whether the data on the tape library device 510 corresponding to the read requested data is updated data. The VL controller 321 references the VL management table 331. If the read requested data has a "Hit" status or a "Miss" status, it is determined that the data on the tape library device 510 is updated data. The VL controller 321 notifies the temporary storage processor 323 of the determination results. If the read requested data has a "Dirty" status, the VL controller 321 determines that the data on the tape library device 510 is not updated data, and notifies the temporary storage processor 323 of the determination results.

If it is determined that the data on the tape library device 510 is updated data, operation S75 is executed. If it is determined that the data on the tape library device 510 is not updated data, operation S74 is executed.

In operation S74, the fault controller 322 notifies the host interface processor 221 in the channel processor 200 of an error creation via the VL controller 321. The host interface processor 221 notifies the host device 100 that a data read error has taken place.

In operation S75, the fault controller 322 retrieves a physical volume of the read requested data from the VL controller 321. The fault controller 322 transfers the retrieved physical volume to the tape interface processor 521 in the device processor 500 and causes the tape interface processor 521 to prepare a tape cassette corresponding to the transferred physical volume. The tape interface processor 521 controls the tape library device 510, thereby causing the tape library device 510 to mount on a tape deck the tape cassette corresponding to the physical volume received from the fault controller 322. In this case, data read cuing is preferably performed such that the data read process is ready to be started.

In operation S76, the fault controller 322 queries the temporary storage processor 222 in the channel processor 200 to determine whether an empty memory space is available on the temporary storage area 231 in the channel processor 200. If an empty memory space is available on the temporary storage area 231, operation S80 is executed. If no empty memory space is available on the temporary storage area 231, operation S77 is executed. Operations S75 and S76 may be performed in parallel with time.

In operation S77, the fault controller 322 queries the temporary storage processor 323 to determine whether an empty memory space is available on the temporary storage area 333 in the VL control processor 300. If an empty memory space is available on the temporary storage area 333, operation S79 is executed. If no empty memory space is available on the temporary storage area 333, operation S78 is executed.

In operation S78, the fault controller 322 references the temporary storage management table 332. If data is already stored on the temporary storage area 333, the fault controller 322 requests the temporary storage processor 323 to delete the oldest data portion of the data. A memory space becomes available on the VL control processor 300. The fault controller 322 deletes from the temporary storage management table 332 information related to the data deleted from the temporary storage area 333.

In operation S79, the fault controller 322 references the temporary storage management table 332. If data is stored on the temporary storage area 231 in the channel processor 200, the fault controller 322 moves the data to the temporary storage area 333 in the VL control processor 300. The fault controller 322 retrieves the data from the temporary storage area 231 via the temporary storage processor 222 in the channel processor 200, and then stores the retrieved data onto the temporary storage area 333 through the temporary storage processor 323. The fault controller 322 updates the corresponding address and storage area type on the temporary storage management table 332.

In operation S80, the read requested data is transferred from the tape library device 510 to the temporary storage area 231 in the channel processor 200. In this operation, the fault controller 322 requests the temporary storage processor 222 in the channel processor 200 to read the data from the tape library device 510. The temporary storage processor 222 retrieves the data via the tape interface processor 521 in the device processor 500, and stores the retrieved data onto the temporary storage area 231. Upon detecting that the data storage operation to the temporary storage area 231 has been completed, the fault controller 322 updates the corresponding address and storage area type on the temporary storage management table 332.

Subsequent to operation S75, the tape cassette having the data loaded thereon is already prepared on the tape library device 510. The data stored on the tape cassette is thus read within a relatively short period of time, and then transferred to the channel processor 200.

In operation S81, the data stored on the temporary storage area 231 in the channel processor 200 is transmitted to the host device 100. In this operation, the fault controller 322 requests the temporary storage processor 222 in the channel processor 200 to read the data from the temporary storage area 231 and transmit the read data to the host device 100. The temporary storage processor 222 reads the corresponding data from the temporary storage area 231, transfers the data to the host interface processor 221, and causes the host interface processor 221 to transmit the data to the host device 100. Upon completing the data transmission to the host device 100, the temporary storage processor 222 transmits a data transmission completion notification to the fault controller 322.

In operation S82, the fault controller 322 receives the data transmission completion notification from the temporary storage processor 222 in the channel processor 200. The fault controller 322 transfers a process completion notification to the host interface processor 221 in the channel processor 200 through the VL controller 321. The host interface processor 221 then notifies the host device 100 of a write process completion.

Referring to FIGS. 12 and 13, the data is read from the tape library device 510 and then transmitted to the host device 100 when the read request is received from the host device 100 in the event of a fault in the disk array device 400. The data read from the tape library device 510 is temporarily stored on the temporary storage area (S80), and then transmitted from the temporary storage area to the host device 100 (S81).

The temporary storage area having the data stored thereon is used as a primary storage until the disk array device 400 has been recovered from the fault. In other words, if the host device 100 requests the same data as the data stored on the temporary storage area to be read, the data is read from the temporary storage area and transmitted to the host device 100 (S72). The data read from the tape library device 510 is stored onto the temporary storage area 231 in the channel processor 200 with high priority. After the data from the tape library device 510 is stored on the temporary storage area, the host device 100 may request the same data to be read. The data is transmitted to the host device 100 within a short period of time with the temporary storage area used as a primary storage.

The requested data may be transmitted to the host device 100 in reply to the read request in the process responsive to the read request even if the disk array device 400 is in a faulty state. The virtual library is thus continuously used. Since the read data is temporarily stored on the existing storage area within the system, there is no need to arrange a new dedicated storage device for storage purposes. No increase is caused in the manufacturing cost and the installation space of the storage device. A low-cost and high reliability system thus results.

In accordance with the second embodiment, the function of the channel processor 200 and the function of the VL control processor 300 may be implemented by a single device. In such a case, the temporary storage processor 222 and the temporary storage area 231 illustrated in FIG. 6 become unnecessary, and the function of the temporary storage area 231 is performed by the temporary storage area 333. More specifically, if a data read request is issued with the disk array device 400 in a faulty state, the data read from the tape library device 510 may be stored onto the temporary storage area 333.

The functions of the VL control processor 300 and the channel processor 200 may be implemented by the host device 100. In such a case, the host device 100 may manage the virtual library.

The function of the device processor 500 and the function of the VL control processor 300 may be implemented by a single device. In such a case, the temporary storage processor 522 and the temporary storage area 531 illustrated in FIG. 6 become unnecessary, and the function of the temporary storage area 531 is performed by the temporary storage area 333. More specifically, if a data write request is issued with the disk array device 400 in a faulty state, the write read may be simply stored onto the temporary storage area 333.

The functions of the channel processor 200, the VL control processor 300, and the device processor 500 may be implemented by a single device. Such an arrangement is described as a third embodiment.

Figure 14:
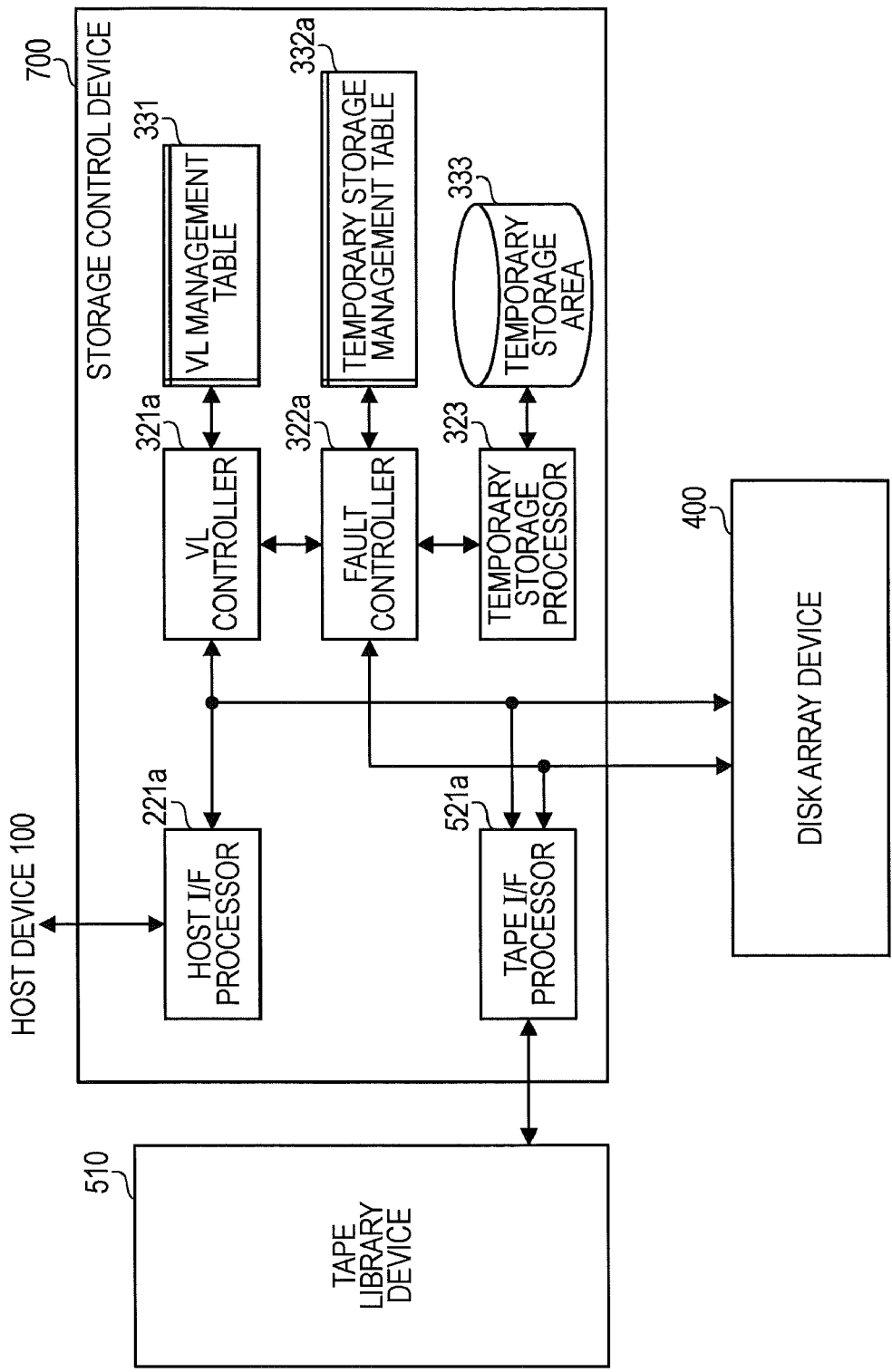
FIG. 14 is a functional block diagram of a storage control device in accordance with a third embodiment.

FIG. 14 illustrates the function of a storage control device 700 of the third embodiment. In FIG. 14, elements identical to those illustrated in FIG. 6 are designated with the same reference numerals and the discussion thereof is omitted herein.

The storage control device 700 illustrated in FIG. 14 includes host interface processor 221a, VL controller 321a, fault controller 322a, temporary storage processor 323, and tape interface processor 521a. The storage control device 700 may be implemented using the computer having the structure illustrated in FIG. 3. In such a case, the above-described functions are performed when the CPU executes a specific program.

The host interface processor 221a is different from the host interface processor 221 illustrated in FIG. 6 in that the host interface processor 221a is connected to the VL controller 321a and the tape interface processor 521a via internal connection lines and that the host interface processor 221a does not work with the temporary storage processor 222 in FIG. 6. The rest of the host interface processor 221a is substantially identical in function to the host interface processor 221 of FIG. 6.

The VL controller 321a is different from the VL controller 321 of FIG. 6 in that the VL controller 321a is connected to the host interface processor 221a via internal connection lines. The rest of the VL controller 321a is substantially identical to the VL controller 321 of FIG. 6. The VL management table 331 to be referenced may be identical to the counterpart illustrated in FIG. 6. More specifically, the VL controller 321a controls a basic data transfer operation with the disk array device 400 serving as a primary storage and the tape library device 510 serving as a secondary storage.

The fault controller 322a is substantially identical in function to the fault controller 322 illustrated in FIG. 6. More specifically, a data write request or a data read request may be output from the host device 100 with the disk array device 400 in a faulty state. The fault controller 322a causes the virtual library to be continuously operative by using a storage device as a primary storage.

The fault controller 322a is different from the fault controller 322 illustrated in FIG. 6 in that data is stored onto the temporary storage area 333 set up in a storage device (such as an HDD and a RAM) connected to the storage control device 700 regardless of a write request or a read request. For example, if a data write request is issued with the disk array device 400 in a faulty state, the fault controller 322a stores the write data onto the temporary storage area 333. If a data read request is issued with the disk array device 400 in a faulty state, the fault controller 322a stores the data read from the tape library device 510 onto the temporary storage area 333. It becomes unnecessary to store the storage area type illustrated in FIG. 8 on the temporary storage management table 332a.

The tape interface processor 521a is different from the tape interface processor 521 illustrated in FIG. 6 in that the tape interface processor 521a is connected to the host interface processor 221a, the VL controller 321a, and the fault controller 322a via internal connection lines, and that the tape interface processor 521a does not work with the temporary storage processor 522 illustrated in FIG. 6. The rest of the tape interface processor 521a is substantially identical in function to the tape interface processor 521 illustrated in FIG. 6.

The storage control device 700 allows the virtual library to be continuously operative by using the temporary storage area 333 as a primary storage even if the disk array device 400 fails.

The function of the storage control device 700 may be implemented by the host device 100.

The function of each device in the storage system and at least part of the function of the storage control device may be implemented using a computer. In such a case, a program describing the process content of each function is supplied.

By causing the computer to execute the program, the above-described function is performed on the computer. The program described the process content may be recorded on a computer readable recording medium. The computer readable recording media include a magnetic recording medium, an optical disk, a magneto-optical disk, and a semiconductor memory.

To circulate the program, a portable recording medium such as an optical disk having the program recorded thereon may be sold. The program may be stored on a storage device in a server computer, and is then transferred to another computer from the server computer via a network.

The program from a portable recording medium or the program transferred from the server computer may be installed on a storage device of the computer executing the program. The computer reads the program from the storage device thereof, and then executes the read program. The computer may directly read the program from the portable recording medium and execute a process responsive to the program. Each time the program is transferred from the server computer, the computer may execute successively processes responsive to the program.

Even if accesses to the primary storage become difficult, the storage control device may continue the operation of the hierarchical storage system using the temporary storage area.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system for storing data comprising:
   an interface processor for receiving a read or write request;
   a primary storage;
   a secondary storage;
   a storage control device for controlling the primary storage to temporarily store a write requested data when the write request is received by the interface processor and to temporarily store a read requested data read from the secondary storage in case that the requested data is not stored on the primary storage when the read request is received, and controlling the secondary storage to store the write requested data stored on the primary storage; and
   a temporary storage area for temporarily storing data for the primary storage in case that an access to the primary storage fails,
   wherein the storage control device including a controller for, in case that the access to the primary storage fails when the read request is received by the interface processor, determining whether the read requested data, is stored on the temporary storage area, controlling to read the read requested data from the temporary storage area when the read requested data is stored on the temporary storage area, and controlling to read the read requested data from the secondary storage when the requested data is not stored on the temporary storage area.

2. The storage system according to claim 1, wherein the temporary storage area is set up in a first storage temporary area that is at least a part of a storage area used for the interface processor.

3. The storage system according to claim 2, wherein the controller controls to store the data read from the secondary storage onto the first temporary storage area after moving the data stored on the first temporary storage area to a second temporary storage area set up in at least a part of a storage area accessible by the controller, when an empty space available on the first temporary storage area is insufficient.

4. The storage system according to claim 3, wherein the controller determines whether the read requested data is stored on the first or second temporary storage area when the read request is received, controls to read the read requested data from one of the first and second temporary storage areas, and controls to output the read data as a reply to the read request via the interface processor.

5. The storage system according to claim 1, wherein the controller, in case that the access to the primary storage fails when a write request is received by the interface processor, controls to write the write requested data on the temporary storage area, and controls to store the write requested data on the secondary storage after moving the write requested data to the primary storage when an access to the primary storage resumes.

6. The storage system according to claim 5, wherein the temporary storage area is set up in a first storage temporary area that is at least a part of a storage area used for the interface processor.

7. The storage system according to claim 6, wherein the controller controls to store the requested data on the first temporary storage area after moving the data stored on the first temporary storage area to a second temporary storage area set up in at least a part of a storage area accessible to the controller, when an empty space available on the first temporary storage area is insufficient.

8. The storage system according to claim 7, wherein the storage area accessible to the controller is provided in a processor for accessing to the primary storage or in a processor for accessing to the secondary storage.

9. The storage system according to claim 5, wherein the controller controls to move the requested data stored on the temporary storage area to the secondary storage before the access to the primary storage resumes, and in case that the data on the secondary storage is updated with the moved data and unupdated data corresponding to the moved data is stored on the primary storage when access to the primary storage resumes, the controller controls to delete the unupdated data on the primary storage.

10. A storage control device for controlling a primary storage to temporarily store a write requested data when a write request is received and to temporarily store a read requested data read from a secondary storage in case that the read requested data is not stored on the primary storage when the read request is received, and controlling the secondary storage to store the write requested data stored on the primary storage, the storage control device comprising:
   a controller for, in case that the access to the primary storage fails when the read request is received, determining whether the read requested data is stored on a temporary storage area for temporarily storing data for the primary storage, controlling to read the read requested data from the temporary storage area when the read requested data is stored on the temporary storage area, and controlling to read the read requested data from the secondary storage when the read requested data is not stored on the temporary storage area.

11. The storage control device according to claim 10, wherein the temporary storage area is set up in a first temporary storage area that is at least a part of a storage area used for an interface processor, and the interface processor receives the request to the secondary storage.

12. The storage control device according to claim 11, wherein the controller controls to store the data read from the secondary storage onto the first temporary storage area after moving the data stored on the first temporary storage area to a second temporary storage area set up in at least a part of a storage area accessible by the controller when an empty space available on the first temporary storage area is insufficient.

13. The storage control device according to claim 12, wherein the controller determines whether the read requested data is stored on the first or second temporary storage area when the read request is received, controls to read the requested data from one of the first and second temporary storage areas, and controls to output the read data as a reply to the read request via the interface processor.

14. The storage control device according to claim 10, wherein the controller, in case that the access to the primary storage fails when a write request is received, controls to write the requested data on the temporary storage area, and controls to store the requested data on the secondary storage after moving the requested data to the primary storage when the access to the primary storage resumes.

15. The storage control device according to claim 14, wherein the temporary storage area is set up in a first temporary storage area that is at least a part of a storage area used for the interface processor.

16. The storage control device according to claim 15, wherein the controller controls to store the requested data on the first temporary storage area after moving the data stored on the first temporary storage area to a second temporary storage area set up in at least a part of a storage area accessible to the controller when an empty space available on the first temporary storage area is insufficient.

17. The storage control device according to claim 14, wherein the controller controls to move the requested data stored on the temporary storage area to the secondary storage before the access to the primary storage resumes, and in case that the data on the secondary storage is updated with the moved data and unupdated data corresponding to the moved data is stored on the primary storage when the access to the primary storage resumes, the controller controls to delete the unupdated data on the primary storage.

18. A storage control method for controlling an operation in a storage system including a primary storage, a secondary storage, and a storage control device for controlling the primary storage to temporarily store a write requested data when a write request is received and to temporarily store a read requested data read from the secondary storage in case that the read requested data is not stored on the primary storage when a read request is received, and controlling the secondary storage to store the write requested data stored on the primary storage, the storage control method comprising:
   in case that an access to the primary storage fails when the read request is received, determining whether the read requested data is stored on a temporary storage area for temporarily storing data for the primary storage;
   controlling to read the read requested data from the temporary storage area when the read requested data is stored on the temporary storage area; and
   controlling to read the read requested data from the secondary storage when the requested data is not stored on the temporary storage area.

19. The storage control method according to claim 18, wherein the temporary storage area is set up in a first temporary storage area that at least a part of a storage area used for an interface processor and the interface processor receives the request to the secondary storage.

20. The storage control method according to claim 18, wherein the controller, in case that the access to the primary storage fails when the write request is received, controls to store the write requested data on the temporary storage area, and controls to store the write requested data on the secondary storage after moving the write requested data to the primary storage when the access to the primary storage resumes.

* * * * *

UNITED STATES PATENT AND TRADEMARK OFFICE
CERTIFICATE OF CORRECTION

PATENT NO. : 8,321,628 B2
APPLICATION NO. : 12/790035
DATED : November 27, 2012
INVENTOR(S) : Motohiro Sakai et al.

It is certified that error appears in the above-identified patent and that said Letters Patent is hereby corrected as shown below:

Title Page Col. 2 Item [56] (Other Publications); Line 4, Delete "2001" and insert -- 2011 --, therefor.
Column 21, Line 61, In Claim 1, delete "data," and insert -- data --, therefor.

Signed and Sealed this
Fifth Day of March, 2013

Teresa Stanek Rea
*Acting Director of the United States Patent and Trademark Office*